(12) United States Patent
Adachi

(10) Patent No.: US 12,136,032 B2
(45) Date of Patent: Nov. 5, 2024

(54) INFORMATION ESTIMATION APPARATUS AND INFORMATION ESTIMATION METHOD

(71) Applicant: DENSO IT LABORATORY, INC., Tokyo (JP)

(72) Inventor: Jingo Adachi, Tokyo (JP)

(73) Assignee: DENSO IT LABORATORY, INC., Tokyo (JP)

( * ) Notice: Subject to any disclaimer, the term of this patent is extended or adjusted under 35 U.S.C. 154(b) by 1215 days.

(21) Appl. No.: 15/812,118

(22) Filed: Nov. 14, 2017

(65) Prior Publication Data

US 2018/0181865 A1 Jun. 28, 2018

(30) Foreign Application Priority Data

Dec. 27, 2016 (JP) ................................. 2016-252813

(51) Int. Cl.
*G06N 3/04* (2023.01)
*G06F 7/50* (2006.01)
(Continued)

(52) U.S. Cl.
CPC ................ *G06N 3/08* (2013.01); *G06N 3/04* (2013.01); *G06N 3/045* (2023.01); *G06N 3/082* (2013.01);
(Continued)

(58) Field of Classification Search
CPC ........ G06N 3/082; G06N 3/472; G06N 7/005; G06N 3/08; G06N 3/04; G06N 3/045;
(Continued)

(56) References Cited

U.S. PATENT DOCUMENTS

| 5,764,557 | A | * | 6/1998 | Hara | G06F 7/5443 |
| | | | | | 708/603 |
| 5,995,989 | A | * | 11/1999 | Gedcke | G06T 9/001 |
| | | | | | 708/203 |
| 2004/0172401 | A1 | * | 9/2004 | Peace | G06F 17/18 |

FOREIGN PATENT DOCUMENTS

| WO | 2014/105866 A1 | 7/2014 |
| WO | 2016/145379 A1 | 9/2016 |
| WO | 2016/145516 A1 | 9/2016 |

OTHER PUBLICATIONS

John Wolfe, Pattern Clustering by Multivariate Mixture Analysis, U.S. Naval Personnel Research Activity, Mar. 1969 (Year: 1969).*

(Continued)

*Primary Examiner* — Aniss Chad
*Assistant Examiner* — Shien Ming Chou
(74) *Attorney, Agent, or Firm* — Louis Woo

(57) ABSTRACT

A technique for stable and fast computation of a variance representing a confidence interval for an estimation result in an estimation apparatus using a neural network including an integrated layer that combines a dropout layer for dropping out part of input data and an FC layer for computing a weight is provided. When input data having a multivariate distribution is supplied to the integrated layer, a data analysis unit 30 determines, based on a numerical distribution of terms formed by respective products of each vector element of the input data and the weight, a data type of each vector element of output data from the integrated layer. An estimated confidence interval computation unit 20 applies an approximate computation method associated with the data type, to analytically compute a variance of each vector element of the output data from the integrated layer based on the input data to the integrated layer.

3 Claims, 15 Drawing Sheets

(51) Int. Cl.
G06N 3/045 (2023.01)
G06N 3/08 (2023.01)
G06N 3/082 (2023.01)
G06N 7/01 (2023.01)
G06F 7/02 (2006.01)

(52) U.S. Cl.
CPC ................ *G06N 7/01* (2023.01); *G06F 7/02* (2013.01); *G06F 7/50* (2013.01)

(58) Field of Classification Search
CPC .... G06N 7/01; G06N 3/02; G06F 7/02; G06F 7/50
See application file for complete search history.

(56) References Cited

OTHER PUBLICATIONS

Wolfe, Pattern Clustering by Multivariate Mixture Analysis, U.S. Naval Personnel Research Activity, Mar. 1969 (Year: 1969).*

Gal, Dropout as a Bayesian Approximation: representing Model Uncertainty in Deep Learning, University of Cambridge, Jun. 2015 (Year: 2015).*

Hardt, Tight Bounds for Learning a Mixture of Two Gaussians, Proceedings of the Forty-Seventh Annual ACM Symposium on Theory of Computing, 753-760, Jun. 2015 (Year: 2015).*

Gal et al (Dropout as a Bayesian Approximation: representing Model Uncertainty in Deep Learning, University of Cambridge, Jun. 2015) (Year: 2015).*

European Search Report, corresponding European Application No. 17203449.8, May 4, 2018.

David Duvenaud et al., "Avoiding pathologies in very deep networks", Jun. 8, 2016, (arXiv:1402.5836v3).

Yarin Gal et al., "Dropout as a Bayesian Approximation: Representing Model Uncertainty In Deep Learning", Oct. 4, 2016, University of Cambridge (arXiv: 1506.02142v6) (previously submitted).

Yarin Gal et al., Dropout as a Bayesian Approximation: Representing Model Uncertainty In Deep Learning, Jun. 6, 2015, University of Cambridge (arZiv: 1506.02142v1).

S.S.A. Ghazali et al., On the Variance of the Sample Mean From Finite Population, Oct. 2005, Journal of Scientific Research, vol. XXXIV No. 2, pp. 19-23.

* cited by examiner

INFORMATION ESTIMATION APPARATUS AND INFORMATION ESTIMATION METHOD

BACKGROUND OF THE INVENTION

Field of the Invention

The present invention relates to an information estimation apparatus and information estimation method for performing an estimation process using a neural network. The present invention particularly relates to an information estimation apparatus and information estimation method that provide a dropout layer in a neural network to obtain a variance representing a confidence interval for an estimation result.

Background Art

Estimators using neural networks (NN) can process large amounts of information, such as images and sensor signal data, as input data to perform estimation as compared with other estimators, and so are expected to be used in various fields.

A neural network has a structure in which layers for processing data are arranged. Data is supplied to each layer and subjected to computation set in the layer, and then the processed data is output. In detail, input data from an observed object is first supplied to an input layer of the neural network, processed, and output. The data is then supplied to subsequent layers (intermediate layers) in sequence as input data, processed, and output. The process in each layer is thus repeatedly performed to propagate the data in the neural network. Data eventually output from an output layer which is the last layer is an estimation result. The input data from the observed object is n-dimensional vector data of the observation target to be estimated. For example, input data for a monochrome camera image of 10 pixels by 10 pixels is vector data of 10×10=100 dimensions (i.e. n=100) having elements corresponding to the respective pixels.

Each layer in the neural network can be set so that the number of dimensions of input vector data and the number of dimensions of output vector data are different from each other. In other words, the number of dimensions of vector data may increase or decrease when the vector data passes through each layer. Moreover, the number of dimensions of vector data output from the output layer varies depending on what the designer wants to estimate. For example, in the case of estimating a value such as "speed" or "score", the output from the output layer is scalar data of n=1 dimension. In the case of classifying an input image as any of "pedestrian", "car", and "bicycle" (i.e. in the case of performing 3-class classification), the output from the output layer is vector data of n=3 dimensions storing "score" indicating which of the three classes the input image corresponds to.

Processes executed by an estimator for performing an estimation process using a neural network include a learning phase and an estimation phase.

In the learning phase, the designer prepares training data and causes the neural network to learn neuron weights in the neural network so that a desired specific output is produced from input data having a specific pattern, with use of the training data.

In the estimation phase, unknown new data, i.e. test data, is supplied to the neural network having the rule learned in the learning phase to perform estimation. If the learning has been successful, the neural network produces an estimation result according to the learned concept.

A main difference of a conventional estimator using a neural network from other estimators using probabilistic approaches such as Bayesian estimation is that, in the neural network, the estimation result is output merely as a "value", and a variance representing a confidence interval for the estimation result cannot be computed.

Thus, the variance representing the confidence interval cannot be computed in the neural network. This makes it difficult to, for example, set a threshold and adopt only reliable estimation results not less than the predetermined level, because the possibility of erroneous determination is likely to be high. For example, in the case of using a neural network in an environment where high safety is required, such as when estimating a car's surroundings, a serious accident may ensue if its estimation result contains erroneous determination.

Non Patent Document 1 listed below proposes a method of computing an output value and its variance in a neural network. The computation method disclosed in Non Patent Document 1 is described below.

In the variance computation method in Non Patent Document 1, dropout which is normally used to prevent overfitting during learning is also used during estimation, to compute the variance of the estimation result. Dropout is a technique of providing a dropout layer in the layers of a neural network and independently setting each element of input vector data supplied to the dropout layer to zero with probability $p_{drop}$ set by the designer beforehand, as disclosed in Patent Document 1 as an example.

For example, suppose the input vector data has 100 dimensions, i.e., is composed of 100 elements. Each element is independently subjected to the determination of whether or not to set the value included in the element to zero with probability $p_{drop}$ (the value in the original element is unchanged in the case of not setting the value to zero). This results in statistically $100 \times p_{drop}$ elements being zero from among the 100 elements. Thus, dropout causes computation to be performed in the state where the number of elements corresponding to probability $p_{drop}$ are missing (set to zero).

During learning, weights are computed so as to minimize the difference of an output result obtained in the state of elements missing with probability $P_{drop}$ from desired correct solution data. This computation is repeated many times during learning. In detail, each element of another vector data supplied to the dropout layer is independently subjected to the determination of whether or not to set the value included in the element to zero with probability $p_{drop}$, computation is performed for the other vector data in the state where the number of elements corresponding to probability $p_{drop}$ are missing, and the weights are computed so as to minimize the difference from the desired correct solution data. By repeatedly performing learning using dropout for input vector data in this way, the neural network learns to be able to output the same correct solution data as an estimation result irrespective of which elements of vector data are missing.

This computation method using dropout has conventionally been employed only during learning. In other words, dropout has conventionally been used during learning, but not during estimation.

Non Patent Document 1 introduces a technique whereby, during estimation computation, too, computation involving dropout is repeatedly performed many times on input vector data from the same object to obtain an output value and its variance. Such estimation using dropout is called Monte Carlo (MC) dropout in Non Patent Document 1. The pattern of the group of elements of input vector data set to zero with probability $p_{drop}$ in the dropout layer differs at each estimation computation due to element missing, so that the final estimation result after passing through the subsequent layers also differs each time. In this specification, the phenomenon that the output estimation result differs for each input of vector data is also referred to as "fluctuation" of the estimation result.

FIG. 1A shows an output value obtained by performing computation once, and FIG. 1B shows a distribution of output values obtained by repeatedly performing computation many times. In FIG. 1A, an output value obtained by performing computation once is plotted on a graph (whose horizontal axis indicates value). In FIG. 1B, output values obtained by performing computation a plurality of times (10 times in this example) are plotted on a graph (whose horizontal axis indicates value, and vertical axis schematically indicates frequency).

FIG. 1C shows a histogram obtained by counting, as frequency, the distribution of output values shown in FIG. 1B for each value. In FIG. 1C, the distribution shown in FIG. 1B is expressed by a histogram indicating the relationship between the magnitude of the output value (horizontal axis) and the frequency (vertical axis). Performing many trials in this way makes it possible to obtain the output value distribution. FIG. 1C also shows a graph of a probability density distribution of estimates (the graph shown by the dotted line in FIG. 1C), a mean, and an estimated variance yielded by statistical processing. In this specification, performing many trials in this way to find a probability density distribution is also referred to as "computation in a Monte Carlo manner".

In Non Patent Document 1, computation is performed MC times to collect MC (about 200 or less) values of final output vector data which varies each time, and the variance of these values is computed according to the following expression. The variance yielded from this expression is defined as uncertainty with respect to input data.

$$\mathrm{Var}_{q(y^*|x^*)}(y^*) \approx$$
$$\tau^{-1} I_D + \frac{1}{T} \sum_{t=1}^{T} \hat{y}^*(x^*, \hat{M}_1^t, \ldots, \hat{M}_L^t)' \hat{y}^*(x^*, \hat{M}_1^t, \ldots, \hat{M}_L^t) -$$
$$E_{q(y^*|x^*)}(y^*)' E_{q(y^*|x^*)}(y^*)$$

In this expression, x* is an input, y* is an output, T is the number of computations (i.e. T=MC), and the left side is the variance of output y*. As shown in the expression, the left side (variance) is represented as the sum of constant term $\tau^{-1} I_D$ (the first term in the right side) relating to initial variance and the outcome of subtracting the square of the mean of output y* (the third term in the right side) from the variance of output y* (the second term in the right side).

Such computation is intuitively expressed as follows. An estimate of the neural network for the same object is computed many times. At each computation, the value of input vector data to the dropout layer is randomly set to zero to create missing elements randomly in the group of elements of the vector data, thus intentionally fluctuating output data from the dropout layer. If, even in the case of intentionally fluctuating the output data from the dropout layer as mentioned above, the final estimation result output from the output layer does not fluctuate, i.e., the variance is small, the neural network can be regarded as producing an estimate with high reliability. If the final estimation result output from the output layer fluctuates greatly, i.e., the variance is large, the neural network can be regarded as producing an estimate with low reliability.

Patent Document 1 International Publication WO 2014105866 A1

Non Patent Document 1 "Dropout as a Bayesian Approximation: Representing Model Uncertainty in Deep Learning", Yarin Gal, Zoubin Ghahramani: Jun. 6, 2015 (available from https://arxiv.org/pdf/1506.02142v1.pdf)

Non Patent Document 2 "ON THE VARIANCE OF THE SAMPLE MEAN FROM FINITE POPULATION", Syed Shakir Ali Ghazali, Journal of Scientific Research, Volume XXXIV No. 2: October 2005

SUMMARY OF THE INVENTION

However, to obtain the variance for one observation target, the computation subsequent to the dropout layer in the neural network needs to be repeatedly performed many times, as mentioned above. For example, the computation needs to be performed MC (about 200 or less) times. In the case where the number of computations is reduced, the obtained probability density distribution of the output value does not have a smooth distribution profile, making it difficult to accurately estimate the variance. In the case where the number of computations is increased, on the other hand, more accurate variance estimation is possible, but a vast number of computations require time and labor in the computation process. This causes a heavy computational burden in actual use.

To solve the above-mentioned problem, the present invention has an object of providing an information estimation apparatus and information estimation method for performing an estimation process using a neural network, with which a variance as a confidence interval for an estimation result can be computed stably and fast without a vast number of computations.

To achieve the object stated above, the present invention also provides an information estimation apparatus for performing an estimation process using a neural network including an integrated layer that combines a dropout layer for dropping out a part of input data and an FC layer for computing a weight, the information estimation apparatus including: a data analysis unit configured to determine, based on a numerical distribution of terms formed by respective products of each vector element of input data to the integrated layer having a multivariate distribution and the weight, a data type of each vector element of output data from the integrated layer having a multivariate distribution; and an estimated confidence interval computation unit configured to apply an approximate computation method associated with the data type determined by the data analysis unit to computation in the integrated layer, to analytically compute a variance of each vector element of the output data from the integrated layer based on the input data to the integrated layer.

To achieve the object stated above, the present invention provides an information estimation method for performing an estimation process using a neural network including an integrated layer that combines a dropout layer for dropping out a part of input data and an FC layer for computing a weight, the information estimation method including: a data analysis step of determining, based on a numerical distribution of terms formed by respective products of each vector element of input data to the integrated layer having a multivariate distribution and the weight, a data type of each vector element of output data from the integrated layer having a multivariate distribution; and an estimated confidence interval computation step of applying an approximate computation method associated with the data type determined in the data analysis step to computation in the integrated layer, to analytically compute a variance of each vector element of the output data from the integrated layer based on the input data to the integrated layer.

The present invention relates to an estimation technique using a neural network, and has an advantageous effect of computing a variance as a confidence interval for an estimation result stably and fast. The present invention thus accelerates and facilitates the determination of the reliability of the estimation result by the neural network. Moreover, for example, whether or not to adopt the estimation result and whether or not to merge the estimation result with another estimation result by Bayesian estimation or the like can be determined depending on reliability. This greatly widens the range of application of the neural network.

DESCRIPTION OF THE PREFERRED EMBODIMENTS

Figure 1A:
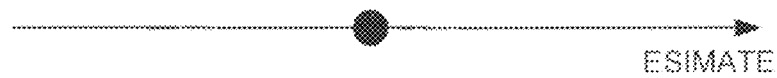
FIG. 1A is a graph showing an output value obtained by a conventional estimator using a neural network and obtained by performing computation once.
Figure 1B:
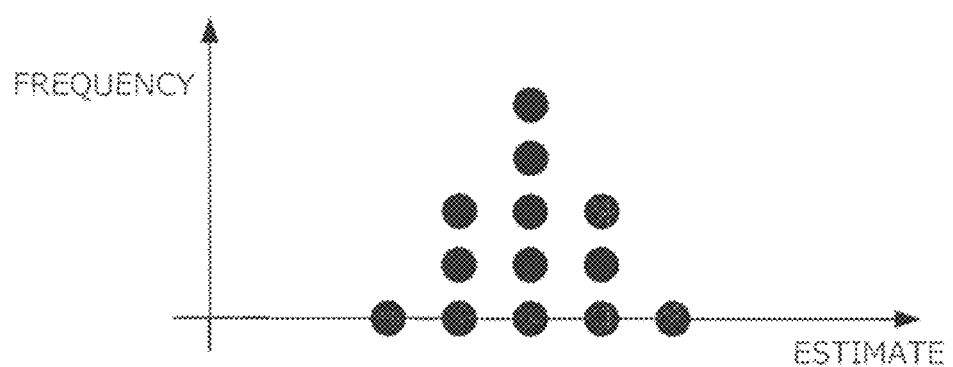
FIG. 1B is a graph showing output values obtained by a conventional estimator using a neural network and obtained by performing computation a plurality of times.
Figure 1C:
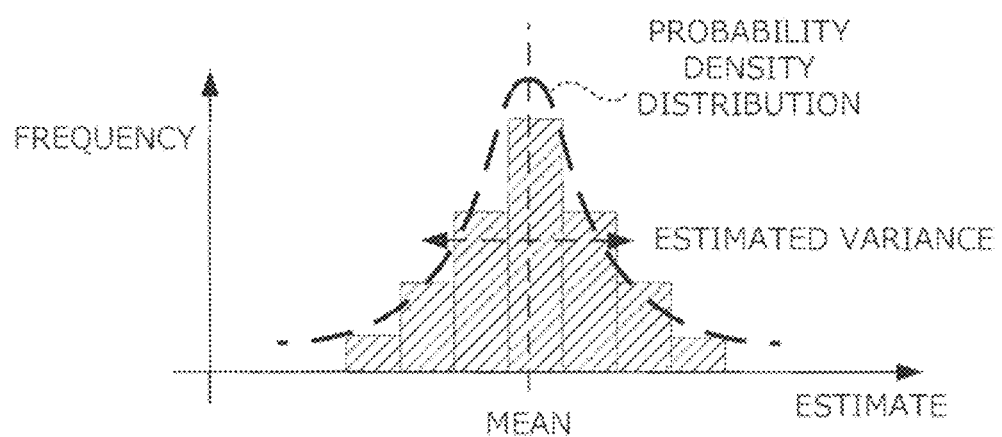
FIG. 1C is a graph showing a histogram of output values of FIG. 1B obtained by performing computation a plurality of times.

The following describes an embodiment of the present invention with reference to drawings. The process in each layer of a neural network and the notation, which are necessary in the description of the embodiment of the present invention, are explained first.

A neural network is composed of a plurality of layers. Input data supplied to each layer is subjected to a computation process defined in the layer, and the processing result is output as output data. The output data is supplied to the next layer as input data to the next layer. In the next layer, the data is equally subjected to a computation process defined in the layer, and the processing result is output as output data. Input, computation, and output are thus repeatedly performed in the layers in sequence, to propagate the data in the neural network. An estimation result is eventually output from an output layer.

In this specification, it is assumed that input data to given layer l of the neural network is $n_{Xin}^l$-dimensional random variable vector $Xin^l$, and output data from layer l is $n_{Xout}^l$-dimensional random variable vector $Xout^l$, which are written as follows. In this specification, $n_{Xin}^l$ denotes that the subscript of n is $Xin^l$, and $n_{Xout}^l$ denotes that the subscript of n is $Xout^l$.

$$Xin^l = (xin^l_1, xin^l_2, \ldots, xin^l_{n_{Xin}^l})$$

$$Xout^l = (xout^l_1, xout^l_2, \ldots, xout^l_{n_{Xout}^l})$$

These random variable vectors $Xin^l$ and $Xout^l$ are expressed as follows, according to probability density functions $Hin^l$ and $Hout^l$ of multivariate distributions having any complex profiles.

$$Xin^l \sim Hin^l$$

$$Xout^l \sim Hout^l$$

For example, if probability density functions $Hin^l$ and $Hout^l$ are Gaussian distributions, the following expressions apply.

$$Xin^l \sim Hin^l = Gauss(\mu_{Xin}{}^l, \Sigma_{Xin}{}^l)$$

$$Xout^l \sim Hout^l = Gauss(\mu_{Xout}{}^l, \Sigma_{Xout}{}^l)$$

Here, $\mu_{Xin}{}^l$ is an $n_{Xin}{}^l$-dimensional vector representing a mean, and $\Sigma_{Xin}{}^l$ is a variance-covariance matrix of $n_{Xin}{}^l \times n_{Xin}{}^l$ size. Meanwhile, $\mu_{Xout}{}^l$ is an $n_{xout}{}^l$-dimensional vector representing a mean, and $\Sigma_{Xout}{}^l$ is a variance-covariance matrix of $n_{Xout}{}^l \times n_{Xout}{}^l$ size. In this specification, $\mu_{Xin}{}^l$ denotes that the subscript of $\mu$ is $Xin^l$, $\Sigma_{Xin}{}^l$ denotes that the subscript of $\Sigma$ is $Xin^l$, $\mu_{Xout}{}^l$ denotes that the subscript of $\mu$ is $Xout^l$, and $\mu_{Xout}{}^l$ denotes that the subscript of $\Sigma$ is $Xout^l$.

According to the present invention, the law of total probability is used to represent each probability density by a mixture of M conditional probability density distributions as shown below.

$$Xin^l \sim Hin^l = P(Hin^l|A_1)P(A_1) + \ldots + P(Hin^l|A_M)P(A_M)$$

$$Xout^l \sim Hout^l = P(Hout^l|B_1)P(B_1) + \ldots + P(Hout^l|B_M)P(B_M)$$

The sum of the probabilities of all conditions is 1, and is expressed as follows.

$$\sum_{m=1}^{M} P(A_m) = 1$$

$$\sum_{m=1}^{M} P(B_m) = 1$$

As an example, if multivariate distributions $Hin^l$ and $Hout^l$ are each a mixture of conditional multivariate Gaussian distributions Gauss, the following expressions apply.

$$Xin^l \sim Hin^l = Gauss(\mu 1_{Xin^l}, \Sigma 1_{Xin^l})P(A_1) + \ldots + Gauss(\mu M_{Xin^l}, \Sigma M_{Xin^l})P(A_M),$$

$$Xout^l \sim Hout^l = Gauss(\mu 1_{Xout^l}, \Sigma 1_{Xout^l})P(B_1) + \ldots + Gauss(\mu M_{Xout^l}, \Sigma M_{Xout^l})P(B_M),$$

Here, data $Xin^l$ or $Xout^l$ of a "random variable obeying a multivariate distribution" simply means data "expressed in general form". This covers the following: In the case of "uni"variate distribution, the data can be a 1-dimensional variable of $n_{Xin}{}^l = 1$, $n_{Xout}{}^l = 1$. In the case where variance-covariance $\Sigma_{Xin}{}^l$, $\Sigma_{Xout}{}^l$ is zero, the data can be a fixed value and not a random variable.

How such multivariate distribution data is computed in each layer of the neural network is briefly described next. The process of each layer is individually described below.

Computation Process in Dropout Layer D

The following describes the computation process in dropout layer D. Let input data to dropout layer D be $n_{Xin}{}^D$-dimensional random variable vector $Xin^D$, and output data from dropout layer D be $n_{Xout}{}^D$-dimensional random variable vector $Xout^D$. In this specification, $n_{Xin}{}^D$ denotes that the subscript of n is $Xin^D$, and $n_{Xout}{}^D$ denotes that the subscript of n is $Xout^D$.

Dropout is represented using indicator function $z=\{0, 1\}$. Here, z is a random variable obeying the Bernoulli distribution as shown below, where $z=0$ with dropout probability $p_{drop}$ and $z=1$ with non-dropout probability $(1-p_{drop})$. Each of the $n_{Xin}{}^D$ elements of input data $Xin^D$ is multiplied by z that is independently set to $z=0$ or $z=1$. Since the overall sum value decreases due to dropout, the scale of the overall value is increased by multiplication by a given constant c.

$$z = (z_1, z_2, \ldots, z_{n_{XinD}})$$

$$z_j \sim Bernoulli(p_{drop}) \quad (1 \leq j \leq n_{XinD})$$

$$Xout^D = Xin^D \cdot z \times c$$

$$c = \frac{1}{1 - p_{drop}} \quad (\cdot \text{ is Hadamard product})$$

Computation Process in Fully Connected (FC) Layer F

The following describes the computation process in fully connected (FC) layer F. Let input data to FC layer F be $n_{Xin}{}^F$-dimensional random variable vector $Xin^F$, and output data from FC layer F be $n_{Xout}{}^F$-dimensional random variable vector $Xout^F$. In this specification, $n_{Xin}{}^F$ denotes that the subscript of n is $Xin^F$, and $n_{Xout}{}^F$ denotes that the subscript of n is $Xout^F$.

The parameters of FC layer F are defined as follows. Let $W^F$ (size: $n_{Xout}{}^F \times n_{Xin}{}^F$) be a matrix representing a weight, and $b^F$ (size: $n_{Xout}{}^F \times 1$) be a vector representing a bias. It is assumed that their optimum values have already been acquired in the learning phase.

The process of computing output data $Xout^F$ from input data $Xin^F$ in FC layer F is performed using the following expressions.

$$Xout^F = W^F \times Xin^F + b^F$$

$$\begin{pmatrix} xout_1^F \\ \vdots \\ xout_{n_{XoutF}}^F \end{pmatrix} = \begin{pmatrix} W_{1,1} & \cdots & W_{1,n_{XinF}} \\ \vdots & \ddots & \vdots \\ W_{n_{XoutF},1} & \cdots & W_{n_{XoutF},n_{XinF}} \end{pmatrix} \begin{pmatrix} xin_1^F \\ \vdots \\ xin_{n_{XinF}}^F \end{pmatrix} + \begin{pmatrix} b_1 \\ \vdots \\ b_{n_{XoutF}} \end{pmatrix}$$

Computation Process in Activation Layer A

The following describes the computation process in activation layer A. Let input data to activation layer A be $n_{Xin}{}^A$-dimensional random variable vector $Xin^A$, and output data from activation layer A be $n_{Xout}{}^A$-dimensional random variable vector $Xout^A$. In this specification, $n_{Xin}{}^A$ denotes that the subscript of n is $Xin^A$, and $n_{Xout}{}^A$ denotes that the subscript of n is $Xout^A$.

An activation function is, for example, a sigmoid function or a rectified linear unit (ReLU) function. When the activation function is denoted as function f, the process of computing output data $Xout^A$ from input data $Xin^A$ in activation layer A is performed using the following expression.

$$Xout^A = f(Xin^A)$$

Computation Process in Dropout Layer D→FC Layer F

A characteristic process according to the present invention is performed in the case where input data which is a random variable obeying a multivariate distribution passes through the above-mentioned dropout layer D, enters some FC layer F, and finally passes through activation layer A, as described later. Assuming a layer (FC layer F with dropout) that integrates dropout layer D and FC layer F as integrated layer DF, the following describes the process in integrated layer DF.

Let input data to integrated layer DF be $n_{xin}^{DF}$-dimensional random variable vector $Xin^{DF}$, and output data from integrated layer DF be $n_{Xout}^{DF}$-dimensional random variable vector $Xout^{DF}$, as shown below. In this specification, $n_{xin}^{DF}$ denotes that the subscript of n is $Xin^{DF}$, and $n_{Xout}^{DF}$ denotes that the subscript of n is $Xout^{DF}$.

$$Xin^{DF} = (xin^{DF}_1, \ldots, xin^{DF}_j, \ldots, xin^{DF}_{n_{xin}DF})$$

$$Xout^{DF} = (xout^{DF}_1, \ldots, xout^{DF}_i, \ldots, xout^{DF}_{n_{xout}DF})$$

In this integrated layer DF, the process of computing output data $Xout^{DF}$ from input data $Xin^{DF}$ involves computation in the part of dropout layer D of integrated layer DF and computation in the part of FC layer F of integrated layer DF. In detail, the computation in integrated layer DF is performed according to the following expressions.

$$Xout^{DF} = W^{DF} \times Xin^{DF} \cdot z + b^{DF}$$

$$\begin{pmatrix} xout_1^{DF} \\ \vdots \\ xout_{n_{Xout}DF}^{DF} \end{pmatrix} = \begin{pmatrix} W_{1,1} & \cdots & W_{1,n_{Xin}DF} \\ \vdots & \ddots & \vdots \\ W_{n_{Xout}DF,1} & \cdots & W_{n_{Xout}DF,n_{Xin}DF} \end{pmatrix} \begin{pmatrix} xin^{DF}_1 z_1 \\ \vdots \\ xin^{DF}_{n_{Xin}DF} z_{n_{Xin}DF} \end{pmatrix} + \begin{pmatrix} b_1 \\ \vdots \\ b_{n_{Xout}DF} \end{pmatrix}$$

For simplicity's sake, a given constant C multiplied in scale adjustment for dropout may be assumed to be incorporated in weight $W^{DF}$.

In particular, the i-th element $xout^{DF}_i$ ($1 \le i \le n_{Xout}^{DF}$) in $Xout^{DF}$ is expressed as follows.

$$xout^{DF}_i = xin^{DF}_1 z_1 W_{i,1} + xin^{DF}_2 z_2 W_{i,2} + \ldots + xin^{DF}_{n_{Xin}DF} z_{n_{Xin}DF} W_{i,n_{Xin}DF} + b_i$$

This is the total sum of the list of terms $xin^{DF}_j W_{i,j}$ ($1 \le j \le n_{Xin}^{DF}$) to which bias term $b_i$ is added at the end. Two types of random variables $xin^{DF}_j$ and $z_j$ are included in this expression, with the rest being fixed values.

Random variable $xin^{DF}_j$ is input data, derives from a transformation of the Bernoulli distribution with dropout in a layer before integrated layer DF, and takes any distribution depending on the structure of the previous layer. Random variable $z_j$ derives from dropout in this integrated layer DF, and is the Bernoulli distribution where $z_j=0$ with probability $p_{drop}$ of $z_j=\{0, 1\}$. These two types of random variables are therefore independent.

Consider the case of computing the value of $xout^{DF}_i$. The number of $xin^{DF}_j W_{i,j}$ terms is $n_{Xin}^{DF}$ ($1 \le j \le n_{Xin}^{DF}$), and $z_j$ in each term can independently take $z_j=0$ or $z_j=1$ as mentioned above. Thus, there are a vast number of branches regarding whether or not each of the $n_{Xin}^{DF}$ number of $xin^{DF}_j W_{i,j}$ terms contributes to the total sum, so that the value that can be taken by $xout^{DF}_i$ which is the sum of the terms has $2^{\wedge} n_{Xin}^{DF}$ (2 raised to the $n_{Xin}^{DF}$th power) variations at the maximum. Computing $xout^{DF}_i$ with dropout many times results in a distribution having fluctuation with discrete scattering of $2^{\wedge} n_{Xin}^{DF}$ types of values.

A typical neural network has the number of neurons of about $n_{Xin}^{DF}=1024$, and so $2^{1024}$ total sums need to be computed. Such computation requires enormous processing, and cannot be completed within practical time.

The present invention proposes a technique of computing a variance, which has conventionally required a vast number of computation processes, with one computation process by using an analytical approach, thus making it unnecessary to perform a vast number of computation processes. According to the present invention, the value of output data that fluctuates at each computation due to dropout is regarded as "random variable". By determining the original "probability density distribution" from which the random variable derives, it is possible to directly find how the distribution profile of the probability density distribution changes by the computation process in each layer. Then, determining the distribution profile of the probability density distribution of the data output from the output layer and computing its variance enables the obtainment of the confidence interval for the estimation result, i.e. the variance.

Structure of Information Estimation Apparatus 10

Figure 2:
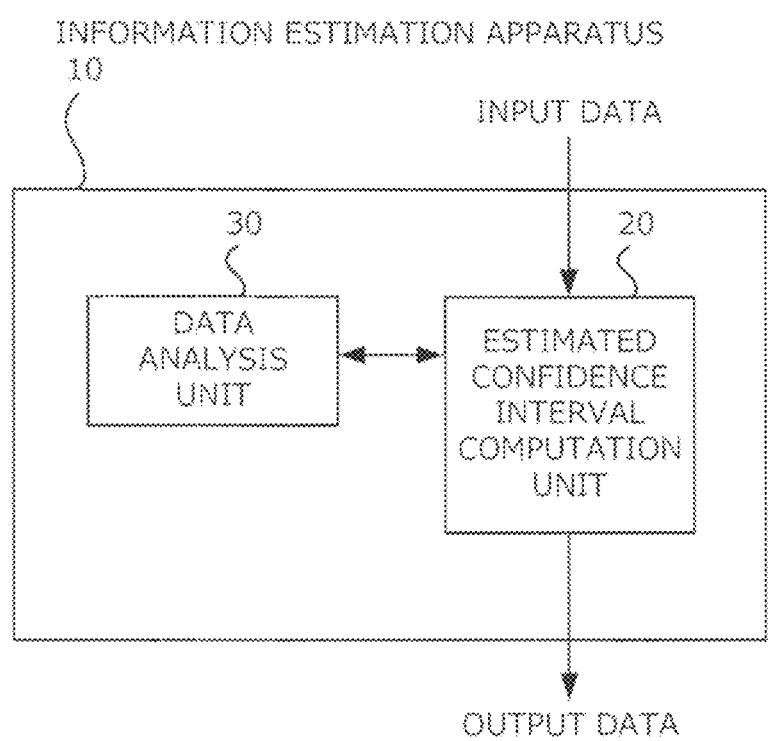
FIG. 2 is a block diagram showing an example of the structure of an information estimation apparatus in an embodiment of the present invention.

The following describes the structure of an information estimation apparatus (estimator for performing an estimation process using a neural network) in the embodiment of the present invention, with reference to FIG. 2. FIG. 2 is a block diagram showing an example of the structure of the information estimation apparatus in the embodiment of the present invention. An information estimation apparatus 10 shown in FIG. 2 includes an estimated confidence interval computation unit 20 and a data analysis unit 30. The information estimation apparatus 10 is an estimator that uses a neural network having a dropout layer, and has a function of obtaining not only an estimation result but also a possible variance of the estimate.

The block diagram used in the description of the apparatus structure in the embodiment of the present invention merely represents the functions related to the present invention, and the functions may be actually implemented by hardware, software, firmware, or any combination thereof. The functions implemented by software may be stored in any computer-readable medium as one or more instructions or codes that are executable by a hardware-based processing unit such as a central processing unit (CPU). The functions related to the present invention may be implemented by various devices including integrated circuits (ICs) and IC chipsets.

The estimated confidence interval computation unit 20 is configured to, in addition to performing a computation process on input data in each layer and outputting an estimation result as in a conventional neural network, compute the distribution profile regarding the distribution with which the input data propagates through and is output from each layer as a result of dropout, and compute the variance output from the final output layer as the confidence interval. If the variance of the estimation result output from the final output layer is large, the estimation result fluctuates greatly, that is, its reliability is low. If the variance is small, the reliability of the estimation result is high. The estimated confidence interval computation unit 20 particularly has a function of performing approximate computation (e.g. approximate computation corresponding to any of the below-mentioned "type 1", "type 2", and "mixed type") corresponding to an approximate computation method determined by the data analysis unit 30, to compute the distribution profile of the data.

For example, the estimated confidence interval computation unit 20 is capable of performing a process of applying the approximate computation method associated with the data type determined by the data analysis unit 30 to the computation in integrated layer DF to thus analytically compute the variance of each vector element of output data from integrated layer DF based on input data to integrated layer DF.

The data analysis unit 30 is configured to analyze the property of data computed in and output from each layer of the neural network, determine an optimum approximate computation method for computing its distribution (data type determination), and notify the approximate computation method to the estimated confidence interval computation unit 20. The data analysis unit 30 particularly has a function of analyzing input data to integrated layer DF combining dropout layer D and FC layer F in the neural network and notifying the estimated confidence interval computation unit 20 of the optimum approximate computation method (e.g. any of the below-mentioned "type 1", "type 2", and "mixed type") for the input data.

For example, the data analysis unit 30 is capable of performing a process of determining, based on the numerical distribution of terms formed by respective products of each vector element of input data to integrated layer DF having a multivariate distribution and a weight, the data type of each vector element of output data from the integrated layer having a multivariate distribution.

The processes in the estimated confidence interval computation unit 20 and the data analysis unit 30 are described in detail below.

Process in Data Analysis Unit 30

The process in the data analysis unit 30 is described first. In integrated layer DF, output data $Xout^{DF}$ is computed based on input data $Xin^{DF}$, as mentioned above. The i-th element $xout^{DF}_i$ ($1 \leq i \leq n_{Xout}^{DF}$) in $Xout^{DF}$ is expressed as follows.

$$xout^{DF}_i = xin^{DF}_1 z_1 W_{i,1} + xin^{DF}_2 z_2 W_{i,2} + \cdots + xin^{DF}_{n_{Xin}^{DF}} z_{n_{Xin}^{DF}} W_{i,n_{Xin}^{DF}} + b_i$$

The data analysis unit 30 analyzes the property of the $xin^{DF}_j W_{i,j}$ term ($1 \leq j \leq n_{Xin}^{DF}$) excluding $z_j$ from among the $n_{Xin}^{DF}$ number of $xin^{DF}_j z_j W_{i,j}$ terms included in the i-th element $xout^{DF}_i$ of $Xout^{DF}$.

The following describes the property of the $xin^{DF}_j W_{i,j}$ term ($1 \leq j \leq n_{Xin}^{DF}$) included in the i-th element $xout^{DF}_i$ of $Xout^{DF}$, with reference to FIGS. 3 to 7. In each of FIGS. 3 to 7, the bar graph of the upper part shows the state of plotting the values of the $xin^{DF}_j W_{i,j}$ terms for each index j, and the histogram of the lower part shows the distribution state of the value of $xout^{DF}_i$ that fluctuates due to the variation of random variable $z_j=\{0, 1\}$ in the case where the value of $xout^{DF}_i$ obtained from the value of the $xin^{DF}_j W_{i,j}$ term having the tendency shown in the upper part is computed many times. In other words, the histogram of the lower part shows, by frequency, which value is frequently yielded in the case of computing $xout^{DF}_i$ many times in a Monte Carlo manner. The histogram thus shows a possible probability density distribution of $xout^{DF}_i$. In each of FIGS. 3 to 7, the horizontal axis in the bar graph of the upper part indicates index j and the vertical axis in the bar graph of the upper part indicates the value of the $xin^{DF}_j W_{i,j}$ term, and the horizontal axis in the histogram of the lower part indicates the value of $xout^{DF}_i$ and the vertical axis in the histogram of the lower part indicates frequency.

Actually, $xin^{DF}_j$ is another independent random variable. However, for example, $xin^{DF}_j$ may be substituted by its mean $\mu_{xin^{DF}_j}$ so that the value of the $xin^{DF}_j W_{i,j}$ term is treated as a fixed value of $\mu_{xin^{DF}_j} W_{i,j}$. In this specification, $\mu_{xin^{DF}_j}$ denotes that the subscript of $\mu$ is $xin^{DF}_j$.

The data analysis unit 30 analyzes the absolute value $|xin^{DF}_j W_{i,j}|$ of each of the $n_{Xin}^{DF}$ number of $xin^{DF}_j W_{i,j}$ terms ($1 \leq j \leq n_{Xin}^{DF}$). A term having an exceptionally larger absolute value than other terms is referred to as "peak term", and the other terms as "non-peak terms" in the this specification. For example, the data analysis unit 30 computes standard deviation $\sigma_{\mu w}$ of all of the $n_{Xin}^{DF}$ number of $xin^{DF}_j W_{i,j}$ terms ($1 \leq j \leq n_{Xin}^{DF}$), and regards any $xin^{DF}_j W_{i,j}$ term larger than or equal to the value $\sigma_{\mu w} D_{ratio}$ obtained by multiplying $\sigma_{\mu w}$ by a predetermined number (ratio $D_{ratio}$) set by the designer beforehand, as an exceptional peak term. For example, suppose the value of the $xin^{DF}_j W_{i,j}$ term is treated as a fixed value of $\mu_{xin^{DF}_j} W_{i,j}$. Then, the condition for an exceptional peak term is defined by the following expression.

$$|\mu_{xin^{DF}_j} W_{i,j}| \geq \sigma_{\mu w} D_{ratio}$$

All peak terms satisfying this condition from among the $n_{Xin}^{DF}$ number of $\mu_{xin^{DF}_j} W_{i,j}$ terms ($1 \leq j \leq n_{Xin}^{DF}$) are computed. Of these peak terms, a predetermined number (set by the designer beforehand, e.g. several, such as 5) of peak terms with greater exceptions are stored as a peak list. Here, the predetermined number indicates the maximum number of peak terms stored as the peak list. There may be a large number of peak terms, or only a few or no peak terms. For example, in the case where the number of peak terms is less than the predetermined number, fewer peak terms than the predetermined number are stored as the peak list. In the case where the number of peak terms is more than the predetermined number, the predetermined number of peak terms are extracted in descending order of exception, and stored as the peak list. The number of peak terms stored as the peak list is hereafter denoted by $n_{peak}$ ($n_{peak} \ll n_{Xin}^{DF}$). Here, $n_{peak}$ takes a value less than or equal to the predetermined number (the maximum number of peak terms stored as the peak list). In the case where there is no peak term, "type 2" is determined as described later, and the peak list does not need to be stored.

Determination of "Type 1"

The data analysis unit 30 determines "type 1" in the case where the peak terms are a few ($n_{peak}$ in number) and the values of the other remaining ($n_{Xin}^{DF} - n_{peak}$) number of terms are small enough to be regarded as zero. This is a distribution in which, of the values of the $xin^{DF}_j W_{i,j}$ terms, a few terms ($n_{peak}$ in number) project like a peak of $\delta$ function and the other remaining ($n_{Xin}^{DF} - n_{peak}$) number of terms are substantially zero.

Figure 4:
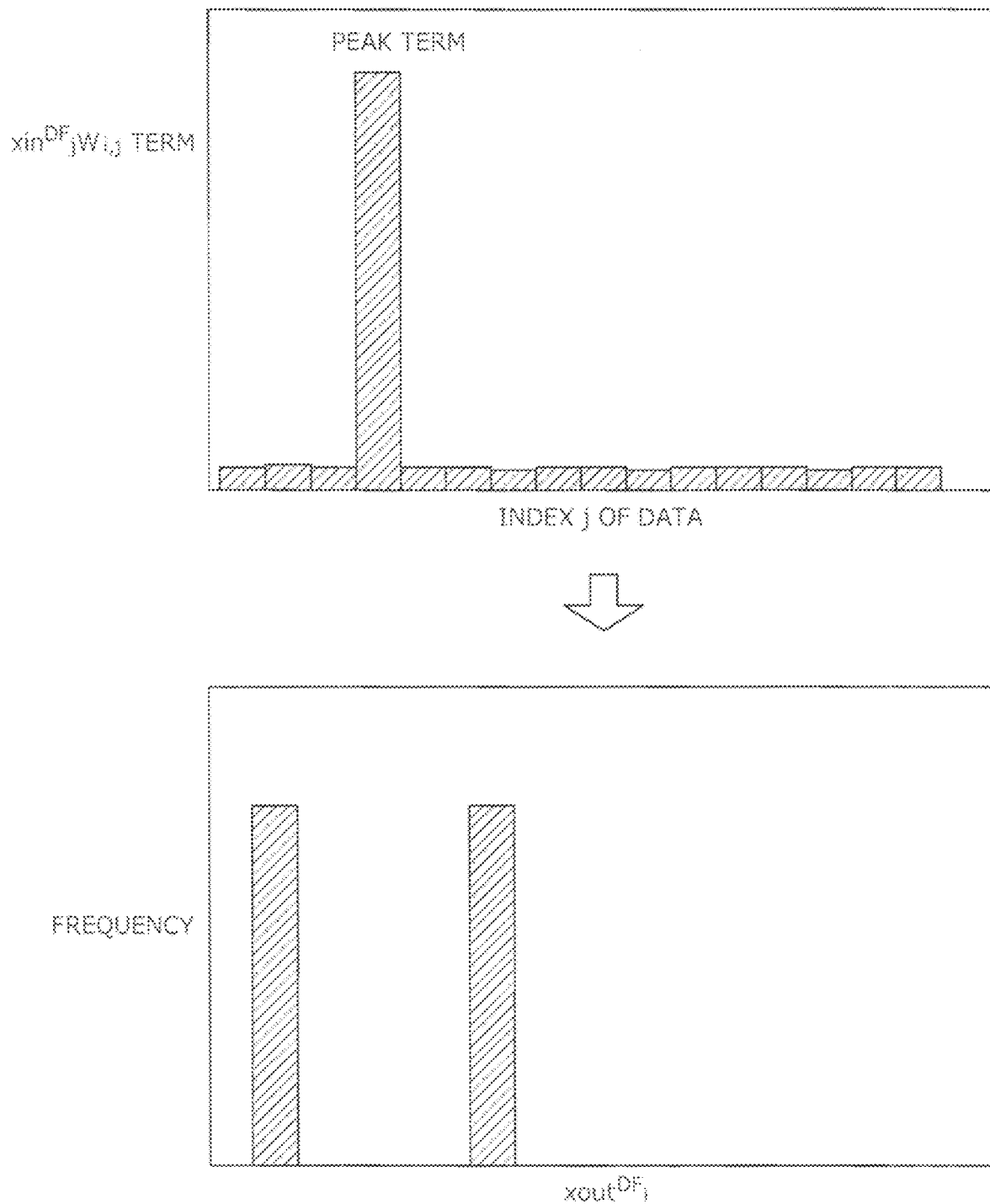
FIG. 4 illustrates a bar graph and a histogram regarding "type 1", the upper part illustrating a bar graph showing an example of plotting the value of the $xin^{DF}_j W_{i,j}$ term for each index j in "type 1" (the number of peak terms is 1), and the lower part illustrating a histogram showing an example of $xout^{DF}_i$ in the case where the value of $xout^{DF}_i$ obtained from the value of the $xin^{DF}_j W_{i,j}$ term having the tendency shown in the upper part is computed many times.
Figure 6:
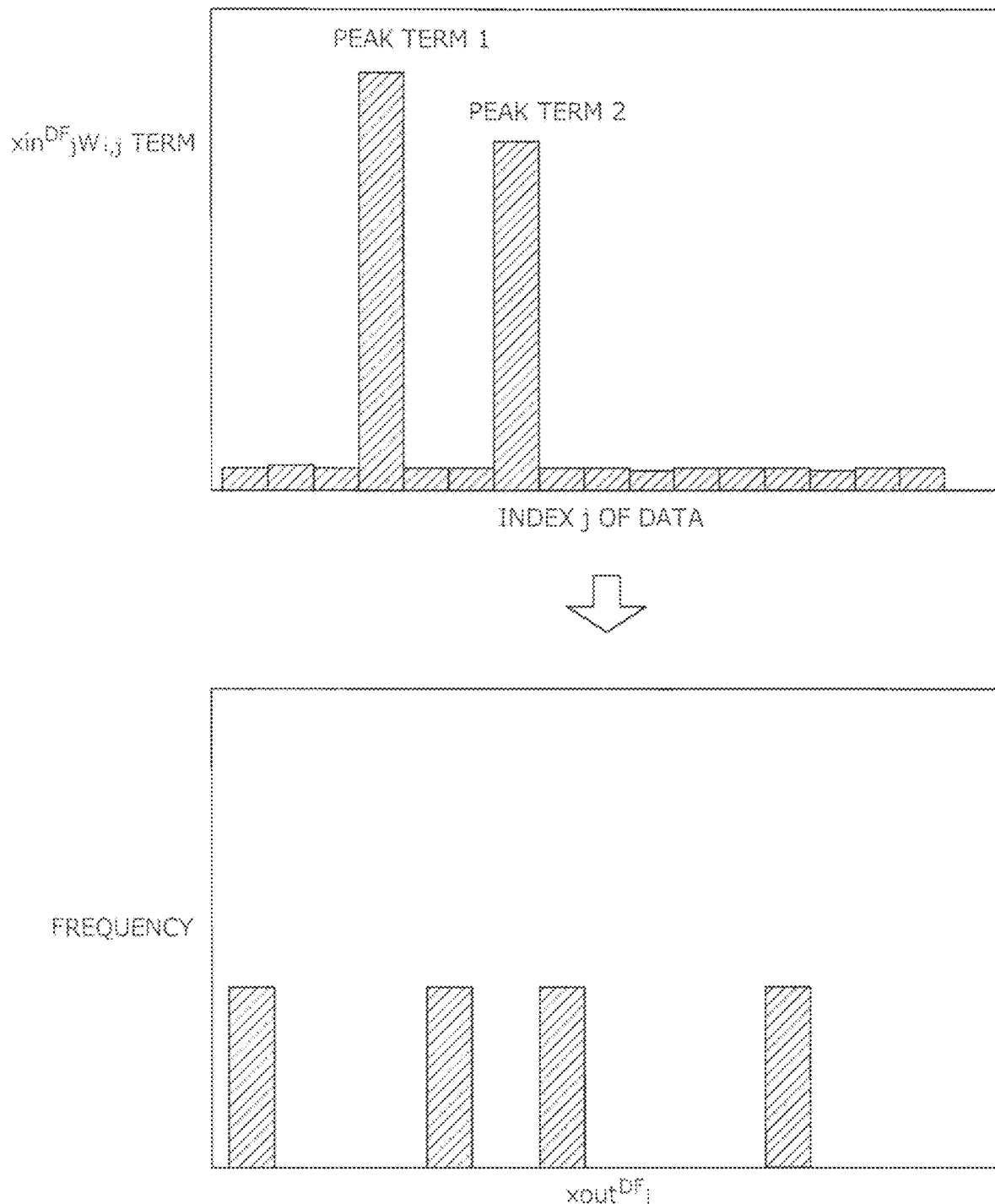
FIG. 6 illustrates a bar graph and a histogram regarding "type 1", the upper part illustrating a bar graph showing an example of plotting the value of the $xin^{DF}_j W_{i,j}$ term for each index j in "type 1" (the number of peak terms is 2), and the lower part illustrating a histogram showing an example of $xout^{DF}_i$ in the case where the value of $xout^{DF}_i$ obtained from the value of the $xin^{DF}_j W_{i,j}$ term having the tendency shown in the upper part is computed many times.

The upper parts of FIG. 4 and FIG. 6 each show the state of the values of the $xin^{DF}_j W_{i,j}$ terms in this case. In the upper part of FIG. 4, one term (one peak term) of the $xin^{DF}_j W_{i,j}$ terms has a large value, and the values of the other terms are small enough to be regarded as zero. In the upper part of FIG. 6, two terms (two peak terms) of the $xin^{DF}_j W_{i,j}$ terms each have a large value, and the values of the other terms are small enough to be regarded as zero.

In the case where $xout^{DF}_i$ is determined as "type 1", the estimated confidence interval computation unit 20 considers only these exceptional peak terms (i.e. $n_{peak}$ number of $xin^{DF}_j W_{i,j}$ terms) while approximating the remaining terms to zero. The estimated confidence interval computation unit 20 can thus compute the distribution of $xout^{DF}_i$ by examining only $2^{\wedge}n_{peak}$ branching combinations of these peak terms, with no need to examine all $2^{\wedge}n_{Xin}{}^{DF}$ branches. The distribution computation method by the estimated confidence interval computation unit 20 in "type 1" will be described later.

Various methods are available to determine whether or not the remaining ($n_{Xin}{}^{DF}-n_{peak}$) number of terms are small enough to be regarded as zero, and the determination method is not limited. As an example, the mean and variance for the distribution of the remaining ($n_{Xin}{}^{DF}-n_{peak}$) number of terms other than the $n_{peak}$ number of peak terms are computed. In the case where a condition that the mean is less than a first predetermined value (close to zero) and the variance is less than a second predetermined value (small variation) is satisfied, the remaining ($n_{Xin}{}^{DF}-n_{peak}$) number of terms other than the peak terms can be determined as being small enough to be regarded as zero. In the case where the condition is not satisfied, the remaining ($n_{Xin}{}^{DF}-n_{peak}$) number of terms other than the peak terms can be determined as not being small enough to be regarded as zero.

Determination of "Type 2"

The data analysis unit 30 determines "type 2" in the case where there is no peak term. Simply stated, this is the case (such as uniform distribution or Gaussian distribution) where all $xin^{DF}{}_j W_{i,j}$ values are similar as a whole without any significant exception.

Figure 3:
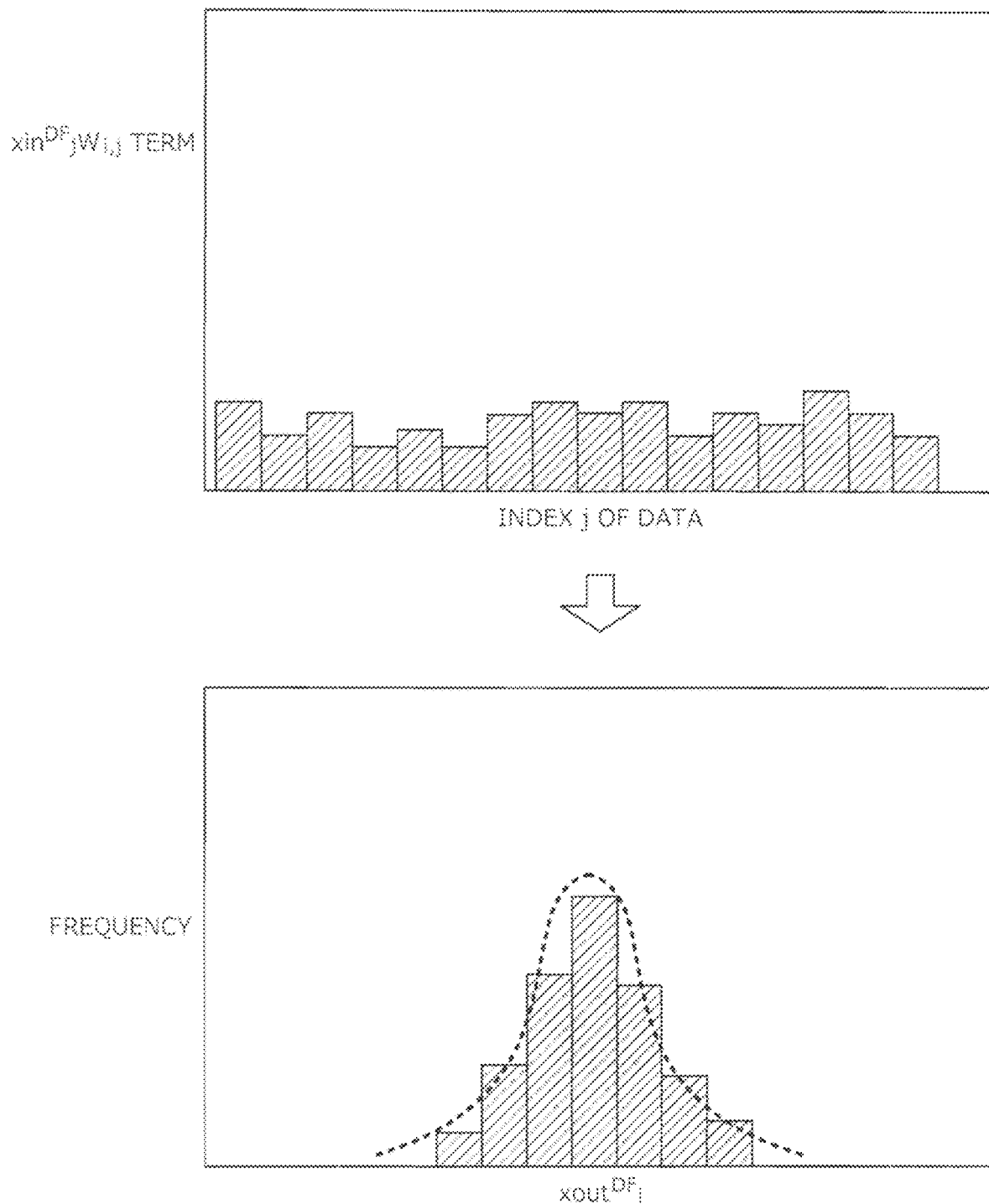
FIG. 3 illustrates a bar graph and a histogram regarding "type 2", the upper part illustrating a bar graph showing an example of plotting the value of the $xin^{DF}_j W_{i,j}$ term for each index j in "type 2", and the lower part illustrating a histogram showing an example of $xout^{DF}_i$ in the case where the value of $xout^{DF}_i$ obtained from the value of the $xin^{DF}_j W_{i,j}$ term having the tendency shown in the upper part is computed many times.

The upper part of FIG. 3 shows the state of the values of the $xin^{DF}{}_j W_{i,j}$ terms in such a case. In the case where $xout^{DF}{}_i$ is determined as "type 2", the central limit theorem holds. The estimated confidence interval computation unit 20 can compute the distribution of $xout^{DF}{}_i$ by treating the total sum distribution as a Gaussian distribution as a whole statistically, with no need to examine $2^{\wedge}n_{xin}{}^{DF}$ branches. The distribution computation method by the estimated confidence interval computation unit 20 in "type 2" will be described later.

Determination of "Mixed Type"

Figure 5:
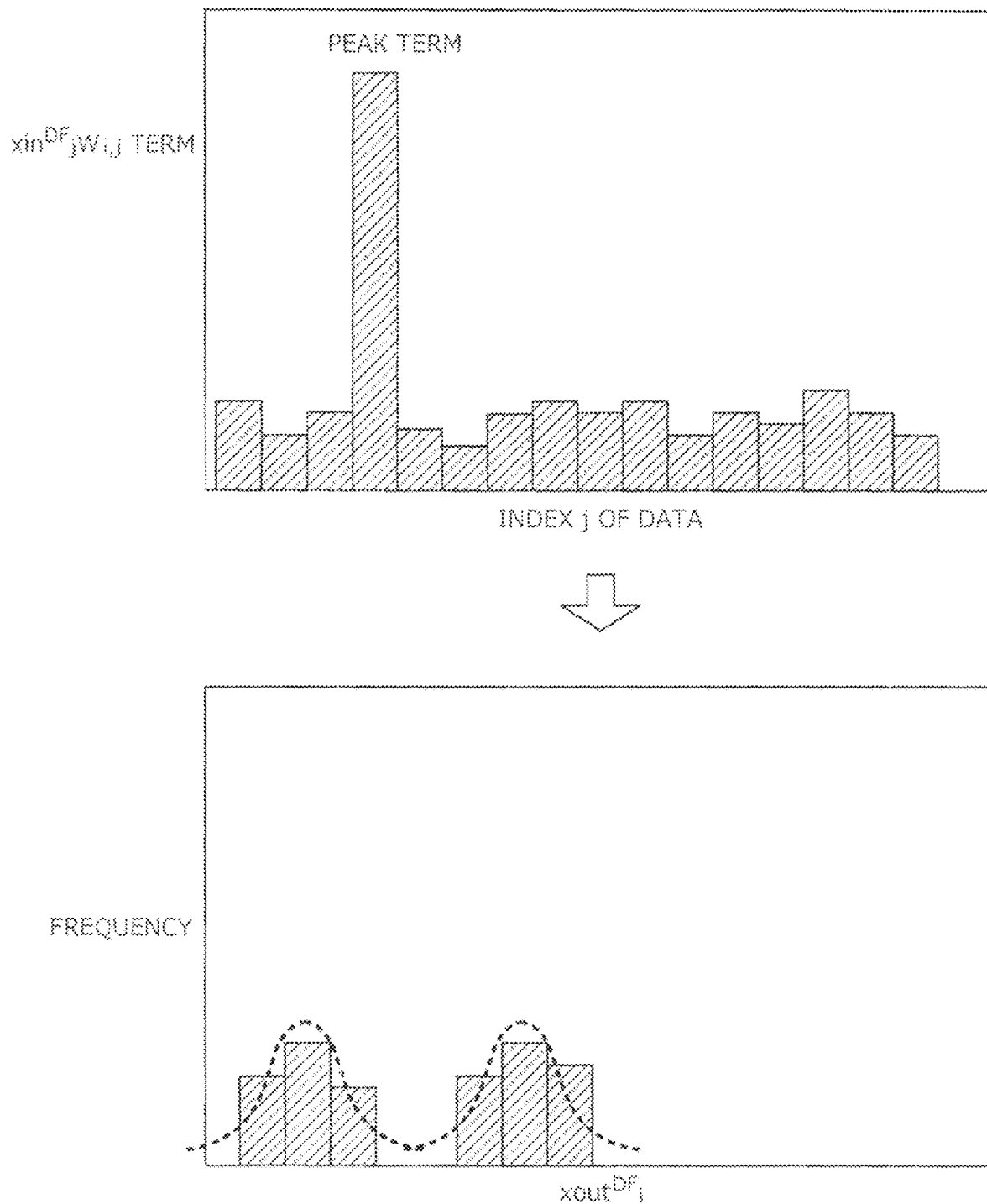
FIG. 5 illustrates a bar graph and a histogram regarding "mixed type", the upper part illustrating a bar graph showing an example of plotting the value of the $xin^{DF}_j W_{i,j}$ term for each index j in "mixed type" (the number of peak terms is 1), and the lower part illustrating a histogram showing an example of $xout^{DF}_i$ in the case where the value of $xout^{DF}_i$ obtained from the value of the $xin^{DF}_j W_{i,j}$ term having the tendency shown in the upper part is computed many times.
Figure 7:
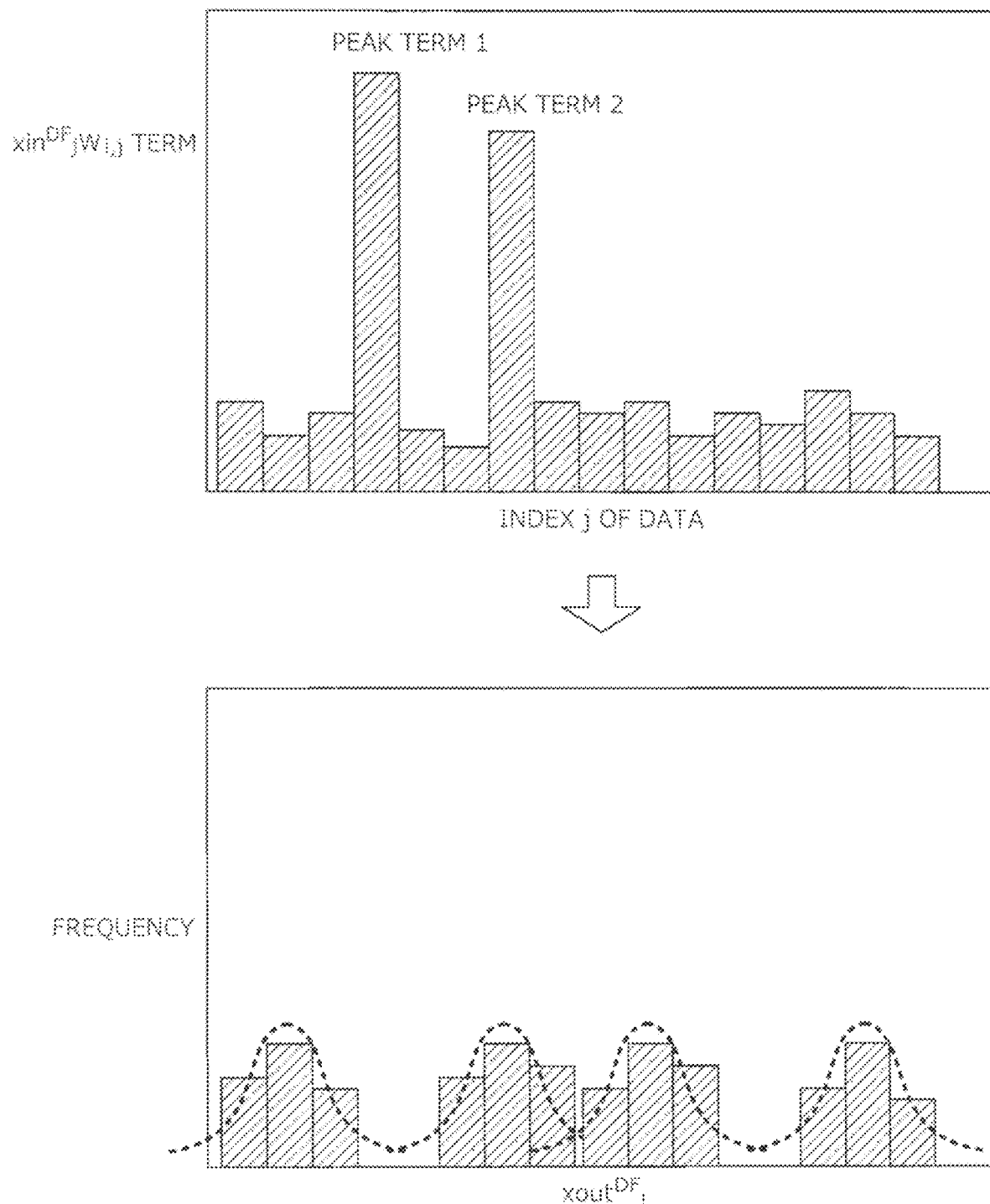
FIG. 7 illustrates a bar graph and a histogram regarding "mixed type", the upper part illustrating a bar graph showing an example of plotting the value of the $xin^{DF}_j W_{i,j}$ term for each index j in "mixed type" (the number of peak terms is 2), and the lower part illustrating a histogram showing an example of $xout^{DF}_i$ in the case where the value of $xout^{DF}_i$ obtained from the value of the $xin^{DF}_j W_{i,j}$ term having the tendency shown in the upper part is computed many times.

Actually, the above-mentioned "type 1" property and "type 2" property are often mixed, as in the state of the values of the $xin^{DF}{}_j W_{i,j}$ terms shown in each of the upper parts of FIG. 5 and FIG. 7. This is the case where there are one or more exceptional terms such as peak terms and the remaining ($n_{Xin}{}^{DF}-n_{peak}$) number of terms other than the peak terms are not small enough to be regarded as zero.

In the upper part of FIG. 5, one term (one peak term) of the $xin^{DF}{}_j W_{i,j}$ terms has a large value, and the values of the other terms are not small enough to be regarded as zero. In the upper part of FIG. 7, two terms (two peak terms) of the $xin^{DF}{}_j W_{i,j}$ terms each have a large value, and the values of the other terms are not small enough to be regarded as zero.

In such a case, the data analysis unit 30 determines "mixed type" which is a mixture of "type 1" and "type 2". In "mixed type", the estimated confidence interval computation unit 20 first acquires the peak terms assuming "type 1", and treats these values not as random variables but as conditional fixed values (e.g. $\mu_{xin}{}^{DF}{}_j W_{i,j}$). Regarding the remaining ($n_{Xin}{}^{DF}-n_{peak}$) number of terms other than the peak terms, the estimated confidence interval computation unit 20 can compute the distribution assuming conditional "type 2". The distribution computation method by the estimated confidence interval computation unit 20 in "mixed type" will be described later.

The process in the estimated confidence interval computation unit 20 is described next. The following describes the distribution computation method by the estimated confidence interval computation unit 20 in each of "type 1", "type 2", and "mixed type" determined by the data analysis unit 30, in detail.

Distribution Computation Method in "Type 1"

The distribution computation method in "type 1" is described first. In the case where the data analysis unit 30 determines the property of the $xin^{DF}{}_j W_{i,j}$ terms included in the i-th element $xout^{DF}{}_i$ of $Xout^{DF}$ computed in integrated layer DF as "type 1", the estimated confidence interval computation unit 20 computes the distribution of $xout^{DF}{}_i$ using only the $n_{peak}$ number of peak terms stored as the peak list.

First, consider the simplest case where the number of peak terms is 1, i.e., $n_{peak}=1$. In this case, the values of the $xin^{DF}{}_j W_{i,j}$ terms are, for example, in the state shown in the upper part of FIG. 4.

Suppose the j=$peak_i$-th term ($1 \leq peak_i \leq n_{XinDF}$) in $xout^{DF}{}_i$ is exceptional. When this peak term is denoted by $xin^{DF}{}_{peaki} z_{peaki} W_{i,peaki}$, $xout^{DF}{}_i$ is expressed as follows. In this specification, $xin^{DF}{}_{peaki}$ denotes that the subscript of $xin^{DF}$ is $peak_i$, $z_{peaki}$ denotes that the subscript of z is $peak_i$, and $W_{i,peaki}$ denotes that the subscript of W is i,$peak_i$.

$$xout^{DF}{}_i = xin^{DF}{}_1 z_1 W_{i,1} + xin^{DF}{}_2 z_2 W_{i,2} + \\ + xin^{DF}{}_{peaki} z_{peaki} W_{i,peaki} + \\ + xin^{DF}{}_{n_{XinDF}} z_{n_{XinDF}} W_{i,n_{XinDF}} + b_i$$

Regarding the $xin^{DF}{}_j W_{i,j}$ terms excluding $z_j$ of these terms, in the case where one term (j=$peak_i$-th term) of the $xin^{DF}{}_j W_{i,j}$ terms has a large value and the other terms are small enough to be regarded as zero as shown in the upper part of FIG. 4 as an example, $xout^{DF}{}_i$ is expressed as follows.

$$xout^{DF}{}_i \approx xin^{DF}{}_{peaki} z_{peaki} W_{i,peaki} + b_i$$

Since random variable $z_{peaki}=\{0, 1\}$, $xout^{DF}{}_i$ has a value with two branches as shown below.

$$xout_i^{DF} = \begin{cases} xin_{peak_i}^{DF} W_{i,peak_i} + b_i, & \text{when } z_{peak_i} = 1, \text{probability}(1 - p_{drop}) \\ b_i, & \text{when } z_{peak_i} = 0, \text{probability } p_{drop} \end{cases}$$

The probability density function obeyed by $xout^{DF}{}_i$ given by this expression is the following, when using $\delta$ function and simplifying $X=xout^{DF}{}_i$.

$$X \sim PDF(X) = \\ p(z_{peak_i} = 1) \times PDF(X \mid z_{peak_i} = 1) + p(z_{peak_i} = 0) \times PDF(X \mid z_{peak_i} = 0) = \\ (1 - p_{drop}) \times \delta(X - (xin_{peak_i}^{DF} W_{i,peak_i} + b_i)) + (p_{drop}) \times \delta(X - b_i)$$

The lower part of FIG. 4 shows the profile of this probability density function. This is the same profile as the histogram of the values as a result of actually computing $xout^{DF}{}_i$ many times in a Monte Carlo manner.

Likewise, $\delta$ function can be used in the case where the number of peak terms is 2 or more. In the case where two terms (two peak terms) of the $xin^{DF}{}_j W_{i,j}$ terms each have a large value and the other terms are small enough to be regarded as zero as shown in the upper part of FIG. 6 as an example, the probability density function of $xout^{DF}_i$ has a profile shown in the lower part of FIG. 6. In this case, there are two peak terms, for each of which there are two cases of whether or not the peak term is selected. Hence, the probability density function of $xout^{DF}_i$ is computed as $2^2=4$ number of $\delta$ functions as shown in the lower part of FIG. 6. This is the same profile as the histogram of the values as a result of actually computing $xout^{DF}_i$ many times in a Monte Carlo manner.

Distribution Computation Method in "Type 2"

The distribution computation method in "type 2" is described next. As in the above-mentioned case, the i-th element $xout^{DF}_i$ of output $Xout^{DF}$ corresponding to input $Xin^{DF}$ is expressed as follows.

$$xout^{DF}_i = xin^{DF}_1 z_1 W_{i,1} + \ldots + xin^{DF}_{n_{XinDF}} z_{n_{XinDF}} W_{i,n_{XinDF}} + b_i$$

In "type 2", the values of the $xin^{DF}_j W_{i,j}$ terms excluding $z_j$ from among the $xout^{DF}_i$ terms are in the state shown in the upper part of FIG. 3. Since all $xin^{DF}_j W_{i,j}$ are similar in value in "type 2", it can be regarded, from the central limit theorem, that a Gaussian distribution forms as the value of each element $xout^{DF}_i$ ($1 \le i \le n_{xout}^{DF}$) of vector $xout^{DF}$ of the output data fluctuates with random variable $z_j = \{0, 1\}$. This can be calculated as "fluctuation of sample sum error" in statistics. The following describes how this can be regarded as "fluctuation of sample sum error".

Suppose $xin^{DF}_j$ is not a random variable, but merely a fixed value $\mu_{Xin}^{DF}_j$. $z_j$ is a random variable of the Bernoulli distribution. Given that $z_j=0$ with probability $p_{drop}$ and $z_j=1$ otherwise as mentioned earlier, the part of the sum of $xin^{DF}_j z_j W_{i,j}$ terms in $xout^{DF}_i$ can be interpreted as the sample sum which is the "sum when sampling the mean $M=N\times(1-p_{drop})$ number of $xin^{DF}_j W_{i,j}$ terms from a population which is a set of $N=n_{xin}^{DF}$ number of $xin^{DF}_j W_{i,j}$ ($1 \le j \le n_{Xin}^{DF}$) terms".

Therefore, $xout^{DF}_i$ is a value obtained by adding bias term $b_i$ to the sum. Each time this sampling is performed, M number of different $xin^{DF}_j W_{i,j}$ are selected, and the value of $xout^{DF}_i$ which is the sum of the M number of different $xin^{DF}_j W_{i,j}$ varies each time while forming a distribution function. This is the "fluctuation of sample sum error".

In "type 2", no exceptional peak term is included in the $n_{xin}^{DF}$ number of $xin^{DF}_j W_{i,j}$ ($1 \le j \le n_{Xin}^{DF}$) terms. Hence, the distribution of the values of the $n_{Xin}^{DF}$ number of $xin^{DF}_j W_{i,j}$ ($1 \le j \le n_{Xin}^{DF}$) terms as the population is weak in kurtosis and skewness, so that the central limit theorem holds from Lyapunov's theorem. The sum value $xout^{DF}_i$ fluctuating at each sampling can therefore be regarded as the Gaussian distribution, as shown in the lower part of FIG. 3.

Since the distribution of $xout^{DF}_i$ can be regarded as the Gaussian distribution as described above, the distribution profile can be identified once its mean $E[xout^{DF}_i]$ and variance $Var(xout^{DF}_i)$ are known.

In the case where the central limit theorem holds, the variance is typically called "variance of sample sum error", and can be analytically computed according to the following expression as described in Non Patent Document 2.

$$Var_{sample} = \frac{\overline{M}(N-\overline{M})}{N-1} Var_{population}$$

Here, $Var_{population}$ is the variance of the $n_{xin}^{DF}$ number of $xin^{DF}_j W_{i,j}$ ($1 \le j \le n_{xin}^{DF}$) terms of the population where $z_j=1$.

$$\Sigma_i^{DF} = Var(xout_i^{DF}) = \frac{\overline{M}(N-\overline{M})}{N-1} Var(xin_1^{DF} W_{i,1}, \ldots, xin_{n_{XinDF}}^{DF} W_{i,n_{XinDF}})$$

Meanwhile, mean $\mu^{DF}_i$ is simply obtained as follows.

$$\mu_i^i = E[xout_i^{DF}] = (1-p_{drop}) \sum_{i=1}^{n_{XinDF}} (xin_j^{DF} W_{i,j}) + b_i$$

Since $xin^{DF}_j$ is fixed value $\mu_{Xin}^{DF}_j$, mean $\mu^{DF}_i$ can be computed according to the following expression.

$$\mu_i^{DF} = E[xout_i^{DF}] = (1-p_{drop}) \sum_{j=1}^{n_{XinDF}} (\mu_{Xin_j^{DF}} W_{i,j}) + b_i$$

Typically, given that $xin^{DF}_j$ is not $\mu_{Xin}^{DF}_j$ but a random variable of a multivariate distribution, the expression in Non Patent Document 2 is further expanded so that the variance of the sum in the case of the random variable with the value of population also obeying the multivariate distribution is expressed as follows. A proof of this expression is given in supplementary note 1 at the end of this specification. The covariance computation method is also described in supplementary note 2.

$$\Sigma_i^{DF} = \frac{\overline{M}(N-\overline{M})}{(N-1)} * Var_{population} + \frac{\overline{M}}{N} \sum_{jj=1}^{N} Var(x_{jj}) + \frac{2\overline{M}}{N} \frac{(\overline{M}-1)}{(N-1)} \sum_{jj1<jj2}^{N} Cov(x_{jj1}, x_{jj2})$$

where $x_{jj} = xin_{jj}^{DF} W_{i,jj}$

Since this variance is the Gaussian distribution, the probability density function of data output value $xout^{DF}_i$ is expressed as follows.

$$xout^{DF}_i \sim Gauss(\mu^{DF}_i, \Sigma^{DF}_i)$$

In the embodiment of the present invention, the case where the central limit theorem holds is "type 2", which is distinguished from "type 1" where the central limit theorem does not hold. "type 2" is mainly found in input data to integrated layer DF near the final output layer of the neural network.

Distribution Computation Method in "Mixed Type"

The distribution computation method in "mixed type" which is a mixture of "type 1" and "type 2" is described next.

There are actually instances where "type 1" and "type 2" are mixed: of the $xin^{DF}_j W_{i,j}$ terms excluding $z_j$, a few terms, i.e. $n_{peak}$ ($n_{Peak} << n_{xin}^{DF}$) number of terms, have exceptionally larger absolute values than other values and the other remaining ($n_{xin}^{DF} - n_{peak}$) number of terms cannot be regarded as zero. In these instances, the distribution cannot be computed by focusing only on a few branches from among $2^{\wedge}n_{Xin}^{DF}$ branches as in "type 1", or by comprehensively treating the sum of $xin^{DF}_{j}z_j W_{i,j}$ terms as the Gaussian distribution as in "type 2".

In such a case, in the embodiment of the present invention, first the property is regarded as "type 1" to extract the peak terms and identify branches regarding peak term combinations, and then computation is performed for each branch as conditional "type 2". This is described below.

First, consider the simplest case where the number of peak terms is 1, i.e., $n_{peak}=1$. The i-th element $xout^{DF}_i$ of vector $xout^{DF}$ of the following output data is concerned here, as in the foregoing case. $xout^{DF}_i$ is expressed as follows.

$$xout^{DF}_i = xin^{DF}_1 z_1 W_{i,1} + \ldots + xin^{DF}_{peak_i} z_{peak_i} W_{i,peak_i} + \ldots + xin^{DF}_{n_{Xin}DF} z_{n_{Xin}DF} W_{i,n_{Xin}}^{DF} + b^i$$

Here, supposing that only the $j=peak_i$-th term ($1 \leq peak_i \leq n_{xin}^{DF}$) in $xout^{DF}_i$ is exceptionally large as in "type 1", the term is denoted by $xin^{DF}_{peaki} z_{peaki} W_{i,peaki}$. The values of the $xin^{DF}_j W_{i,j}$ terms excluding $z_j$ from among these terms are in the state shown in the upper part of FIG. 5 as an example.

If this peak term $xin^{DF}_{peaki} z_{peaki} W_{i,peaki}$ is not a random variable but a fixed value, the remaining terms $xin^{DF}_j z_j W_{i,j}$ ($1 \geq j \neq peak_i \geq n_{Xin}^{DF}$) can then be regarded as including no exceptional value as in "type 2".

Accordingly, for the exceptional peak term $xin^{DF}_{peaki} z_{peaki} W_{i,peaki}$, the case where the term is selected ($z_{peaki}=1$) and the case where the term is not selected ($z_{peaki}=0$) are separately considered, as in "type 1". Conditional "type 2" is then computed in each of these cases.

The expression of $xout^{DF}_i$ is divided into two parts as shown below.

$$xout^{DF}_i = xW^{DF}_i + bias^{DF}_i$$

where $$xW^{DF}_i = xin^{DF}_1 z_1 W_{i,1} + \ldots + 0 + \ldots + xin^{DF}_{n_{Xin}DF} z_{n_{Xin}DF} W_{i,n_{Xin}DF}$$

$$bias^{DF}_i = xin^{DF}_{peak_i} z_{peak_i} W_{i,peak_i} + b_i$$

Here, $xW^{DF}_i$ is the part of the sum of ($n_{xin}^{DF}-1$) number of $xin^{DF}_j z_j W_{i,j}$ terms that varies depending on $z_j=\{0, 1\}$ excluding the peak term, and is a random variable. Meanwhile, $bias^{DF}_i$ includes the peak term and the bias term, and is a fixed value.

When $z_{peaki}=1$, that is, when peak term $xin^{DF}_{peaki} z_{peaki} W_{i,peaki}$ is selected, $p(z_{peaki}=1)=1-P_{drop}$, and the above-mentioned two parts are expressed as follows.

$$xW^{DF}_i = xin^{DF}_1 z_1 W_{i,1} + \ldots + 0 + \ldots + xin^{DF}_{n_{Xin}DF} z_{n_{Xin}DF} W_{i,n_{Xin}DF}$$

$$bias^{DF}_i = xin^{DF}_{peak_i} W_{i,peak_i} + b_i$$

These indicate sampling from a population of a finite number of $xW^{DF}$ terms and computing their sum as in "type 2". The population in this case are $N=(n_{xin}^{DF}-1)$ number of $xin^{DF}_j W_{i,j}$ terms ($1 \leq j$, $j \neq peak_i$, $j \leq n_{xin}^{DF}-1$), whose variance is denoted by $var_{population}$. The computation can be regarded as sampling mean $M=N(1-p_{drop})-1$ number of terms from the population.

As mentioned above, the value $xout^{DF}_i$ of the sum fluctuates at each sampling while forming the Gaussian distribution of mean $\mu 1^{DF}_i$ and variance-covariance $\Sigma 1^{DF}_i$ as shown below.

$$(xout^{DF}_i \mid z_{peak_i} = 1) \sim \text{Gauss}(\mu 1^{DF}_i, \Sigma 1^{DF}_i)$$

where $$\mu 1^{DF}_i = (1 - p_{drop}) \sum_{j=1, j \neq peak_i}^{n_{Xin}DF} (xin^{DF}_j W_{ij}) + xin^{DF}_{peak_i} W_{i,peak_i} + b_i$$

$$\sum 1^{DF}_i = \frac{\overline{M}(N - \overline{M})}{(N-1)} * \text{Var}_{population} +$$

$$\frac{\overline{M}}{N} \sum_{jj=1}^{N} \text{Var}(x_{jj}) + \frac{2\overline{M}}{N} \frac{(\overline{M} - 1)}{(N-1)} \sum_{jj1 < jj2}^{N} \text{Cov}(x_{jj1}, x_{jj2})$$

with $x_{jj} = xin^{DF}_{jj} W_{i,jj}$

When $z_{peaki}=0$, that is, when peak term $xin^{DF}_{peaki} z_{peaki} W_{i,peaki}$ is not selected, $p(z_{peaki}=0)=p_{drop}$, and the above-mentioned two parts are expressed as follows.

$$xW^{DF}_i = xin^{DF}_1 z_1 + \ldots + 0 + \ldots + xin^{DF}_{n_{Xin}DF} z_{n_{Xin}DF} W_{i,n_{Xin}DF}$$

$$bias^{DF}_i = b_i$$

The population are equally $N=(n_{Xin}^{DF}-1)$ number of $xin^{DF}_j z_j W_{i,j}$ terms ($1 \leq j$, $j \neq peak_i$, $j \leq n_{Xin}^{DF}-1$), whose variance is denoted by $\text{Var}_{population}$. The computation can be regarded as sampling mean $M=N(1-p_{drop})$ number of terms from the population, and the value $xout^{DF}_i$ of the sum fluctuates at each sampling while forming the Gaussian distribution of mean $\mu 0^{DF}_i$ and variance-covariance $\Sigma 0^{DF}_i$ as shown below.

$$(xout^{DF}_i \mid z_{peak_i} = 0) \sim \text{Gauss}(\mu 0^{DF}_i, \Sigma 0^{DF}_i)$$

where $$\mu 0^{DF}_i = (1 - p_{drop}) \sum_{j=1, j \neq peak_i}^{n_{Xin}DF} (xin^{DF}_j W_{ij}) + b_i$$

$$\sum 0^{DF}_i = \frac{\overline{M}(N - \overline{M})}{(N-1)} * \text{Var}_{population} +$$

$$\frac{\overline{M}}{N} \sum_{jj=1}^{N} \text{Var}(x_{jj}) + \frac{2\overline{M}}{N} \frac{(\overline{M} - 1)}{(N-1)} \sum_{jj1 < jj2}^{N} \text{Cov}(x_{jj1}, x_{jj2})$$

with $x_{jj} = xin^{DF}_{jj} W_{i,jj}$

Thus, in these two cases, the part of $xW^{DF}_i$ is the Gaussian distribution and bias term $bias^{DF}_i$ is different, both when $z_{peaki}=1$ and $z_{peaki}=0$. When simplifying $X=xout^{DF}_i$, the probability density function of the value of $xout^{DF}_i$ is the following.

$$X \sim PDF(X) =$$

$$p(z_{peak_i} = 1) \times PDF(X \mid z_{peak_i} = 1) + p(z_{peak_i} = 0) \times PDF(X \mid z_{peak_i} = 0) =$$

$$(1 - p_{drop}) \times \text{Gauss}(X; \mu 1^{DF}_i, \Sigma 1^{DF}_i) + (p_{drop}) \times \text{Gauss}(X; \mu 0^{DF}_i, \Sigma 0^{DF}_i)$$

This Gaussian mixture distribution is in the state shown in the lower part of FIG. 5.

The same computation can be performed in the case where the number of peak terms is 2 or more. The upper part of FIG. 7 shows the state of the values of the $xin^{DF}_j W_{i,j}$ terms excluding $z_j$, and the lower part of FIG. 7 shows the probability density distribution of $xout^{DF}_i$ in this case.

As described above, in "mixed type" which is a mixture of "type 1" and "type 2", the probability density distribution of the output data is represented by (2 raised to the (number of peak terms)-th power) number of Gaussian mixture distributions.

This can be written in general form as follows. In the case where data $xout^{DF}_i$ has $n_{peak}$ ($n_{peak} \ll n_{xin}^{DF}$) number of peak terms $xin^{DF}_{peaki} W_{i,peaki}$ there are $2^{\wedge}n_{peak}$ branch conditions $con_k$ ($1 \leq k \leq 2^{\wedge}n_{peak}$) as each peak term corresponds to two cases of being dropped out ($z_{peaki}=0$) and not being dropped out ($z_{peaki}=1$).

As a result, data $X=xout^{DF}_i$ is defined by a probability density function according to the following conditional Gaussian mixture distribution. In this specification, $X_{conk}$ denotes that the subscript of X is $con_k$.

X~PDF(X)=Gauss($X_{con_1}$|con$_1$)P(con$_1$)+ . . . +Gauss
($X_{con_k}$|con$_k$)P(con$_k$)+ . . . +Gauss
($X_{con_{2^n peak}}$|con$_{2^n peak}$)P(con$_{2^n peak}$)

In the neural network having the multilayer structure, data X needs to be processed individually for each function corresponding to a separate condition in each subsequent layer through which output data propagates. Besides, in each integrated layer FC, these conditions branch further, increasing the number of functions that need be computed individually. The number of dropout layers D in one neural network is, however, 3 or less in most cases, so that the technique proposed in the embodiment of the present invention can achieve a practical computation process.

Computation in Activation Layer A

In activation layer A, output data $Xout^A$ resulting from input data $Xin^A$ through activation function f is computed. In detail, the process in activation layer A involves computation according to the following expression.

$Xout^A = f(Xin^A)$

Input data is a random variable obeying a multivariate distribution. In the case of being supplied to activation layer A, it is output as a multivariate distribution distorted with nonlinear activation function f. It is usually difficult to compute what kind of function results when a given complex function is distorted. If the function subjected to input is a known function such as Gaussian distribution or delta function, however, the function can be mathematically determined by approximation to a certain extent. To do so, in the embodiment of the present invention, the above-mentioned representation of a mixture of a plurality of "conditional" probability density functions PDF($X_{conk}$|con$_k$) is employed, with each function being expressed by Gaussian distribution or delta function for which the computation method is known. This enables variant computation in activation function f.

Hence, in activation layer A, it suffices to compute transformed f(PDF($X_{conk}$|con$_k$)) by activation function f with each conditional probability density function as shown below.

X~f(PDF(X))=f(PDF($X_{con_1}$|con$_1$))P(con$_1$)+ . . .
+f(PDF($X_{con_k}$|con$_k$))P(con$_k$)+ . . . +f(PDF($X_{con_K}$|con$_K$))P(con$_K$)

If the layers subsequent to integrated layer DF have no activation layer A and only include simple linear transformation layers, the processes in the subsequent layers may be performed by approximating the mixture distribution to one distribution of up to second moment. In the case where some Gaussian functions in the Gaussian mixture overlap (e.g. individual distributions are similar), too, a speed-up technique such as combining into one Gaussian function may be employed.

In detail, suppose the multivariate Gaussian mixture distribution is expressed as follows.

$$X \sim PDF(X) = \text{Gauss}(X_{con_1} \mid con_1) P(con_1) + \ldots +$$
$$\text{Gauss}(X_{con_{k1}} \mid con_{k1}) P(con_{k1}) + \text{Gauss}(X_{con_{k2}} \mid con_{k2}) P(con_{k2}) \ldots +$$
$$\text{Gauss}(X_{con_{2^{n_{peak}}}} \mid con_{2^{n_{peak}}}) P(con_{2^{n_{peak}}})$$

Regarding the k1-th Gaussian function Gauss($X_{conk1}$|con$_{k1}$) and the k2-th Gaussian function Gauss($X_{conk2}$|con$_{k2}$), in the case where their means and variances are close in value, for example, merging into one Gaussian function Gauss($X_{conk\_1\_2}$|con$_{k\_1\_2}$) as shown below can reduce the number of mixture distributions and lighten the computation process. In this specification, $X_{conk1}$ denotes that the subscript of X is con$_{k1}$, $X_{conk2}$ denotes that the subscript of X is con$_{k2}$, and $X_{conk\_1\_2}$ denotes that the subscript of X is con$_{k\_1\_2}$.

Gauss($X_{con_{k1}}$|con$_{k1}$)P(con$_{k1}$)+Gauss($X_{con_{k2}}$|con$_{k2}$)P(con$_{k2}$)=Gauss($X_{con_{k\_1\_2}}$|con$_{k\_1\_2}$)

For example, two Gaussian functions can be merged by the computation process. When the mean and deviation of Gaussian function Gauss($X_{conk1}$|con$_{k1}$) before merging are denoted respectively by $\mu_{k1}$ and $\sigma_{k1}$ and the mean and deviation of Gaussian function Gauss($X_{conk2}$|con$_{k2}$) before merging are denoted respectively by $\mu_{k2}$ and $\sigma_{k2}$, then the mean $\mu_{k\_1\_2}$ and deviation $\sigma_{k\_1\_2}$ of Gaussian function Gauss($X_{conk\_1\_2}$|con$_{k\_1\_2}$) after merging can be computed as follows.

$$\mu_{k\_1\_2} = \frac{P(con_{k1})\mu_{k1} + P(con_{k2})\mu_{k2}}{P(con_{k1}) + P(con_{k2})}$$

$$\sigma^2_{k\_1\_2} = \frac{(\sigma^2_{k1} + \mu^2_{k1})P(con_{k1}) + (\sigma^2_{k2} + \mu^2_{k2})P(con_{k2})}{P(con_{k1}) + P(con_{k2})} - \mu^2_{k\_1\_2}$$

In any case, eventually the mixed multivariate distribution of data output from the output layer of the neural network is approximated to one distribution function of up to second moment, and its variance is computed as the confidence interval of the final estimation output result.

Processing Flow in Information Estimation Apparatus 10

Figure 8A:
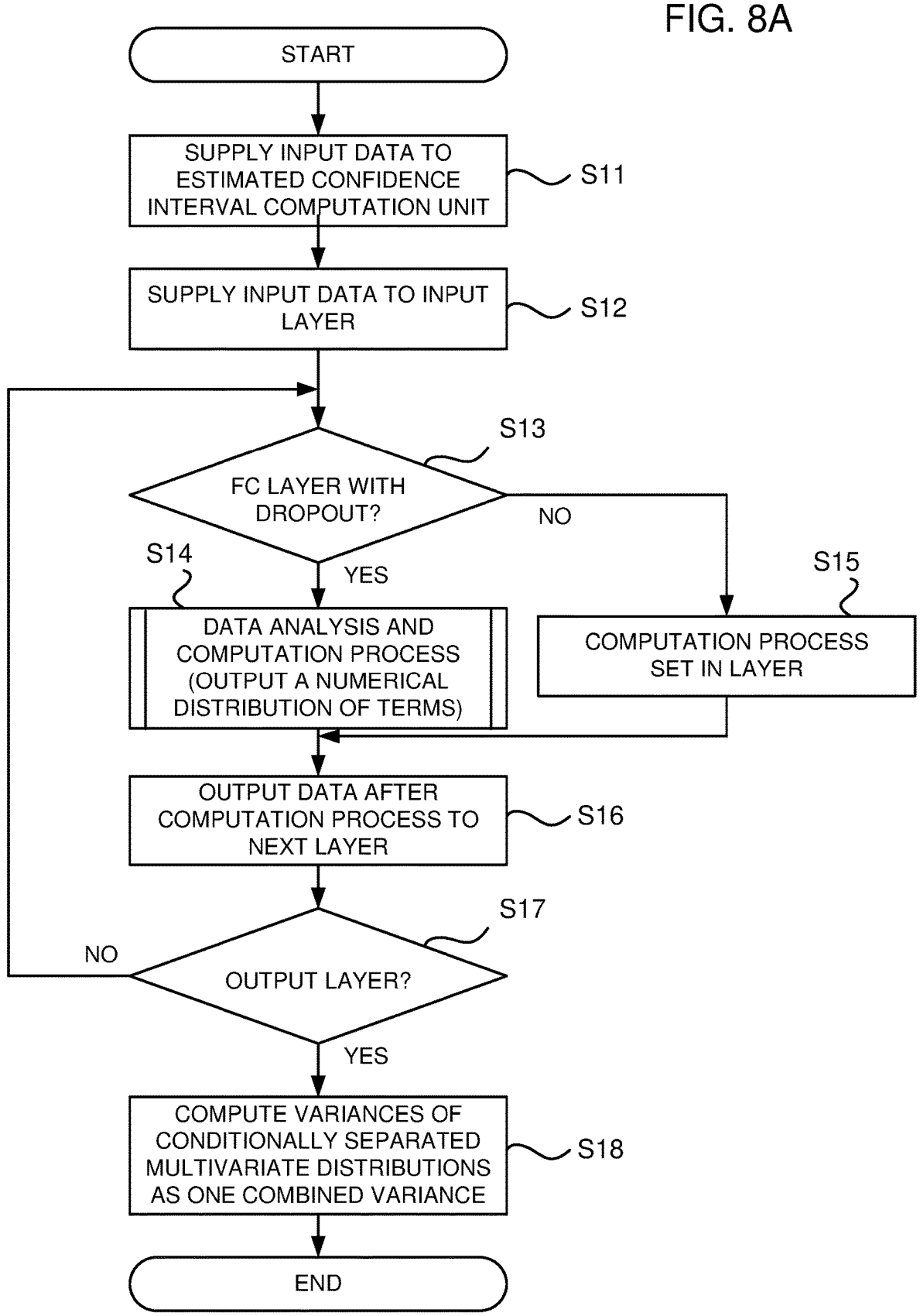
FIG. 8A is a flowchart showing an example of the process by the information estimation apparatus in the embodiment of the present invention.
Figure 8B:
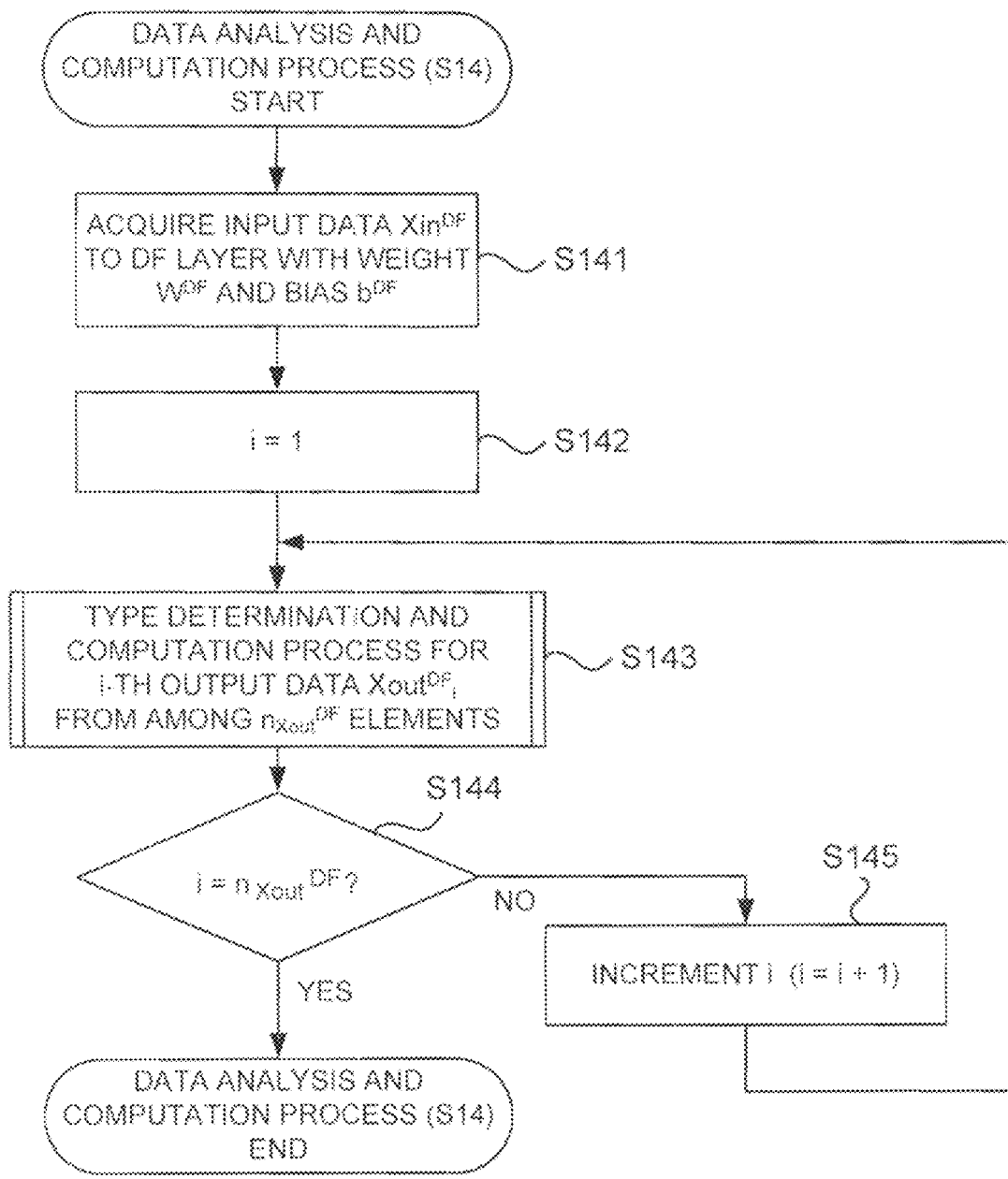
FIG. 8B is a flowchart showing an example of the data analysis and computation process in step S14 in FIG. 8A.
Figure 8C:
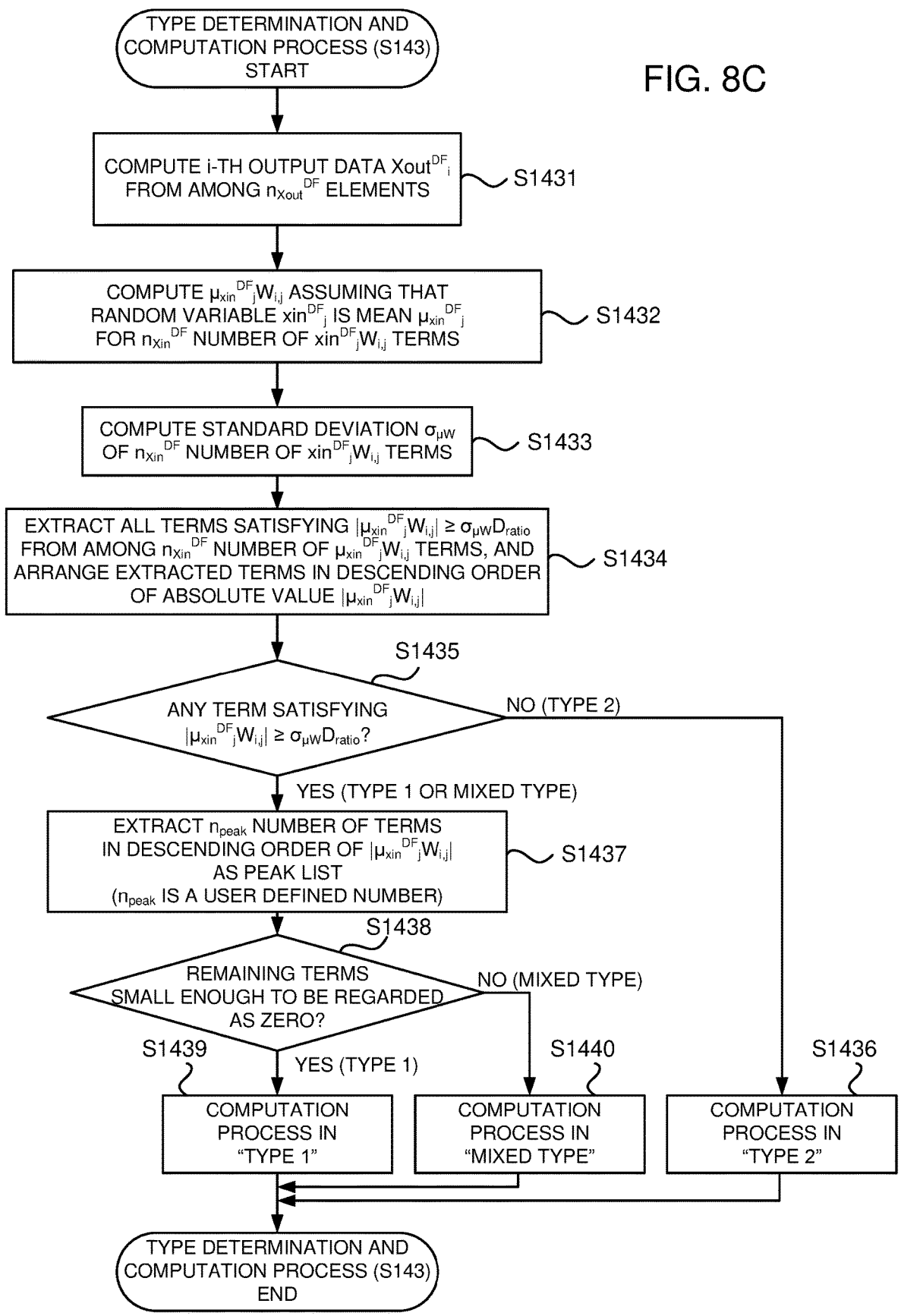
FIG. 8C is a flowchart showing an example of the type determination and computation process in step S143 in FIG. 8B.

The following describes the process in the information estimation apparatus 10, with reference to FIGS. 8A to 8C. The basic processing flow is as follows. The estimated confidence interval computation unit 20 receives input data, and performs computation in each layer of the neural network. In the case where the layer supplied with the data is an FC layer with dropout (integrated layer DF), the data analysis unit 30 analyzes into which type the input data can be classified. The computation process corresponding to the type determined by the data analysis unit 30 is then performed to obtain the variance representing the confidence interval together with the estimation result, with the data being treated as a conditional multivariate distribution.

FIG. 8A is a flowchart showing an example of the process in the information estimation apparatus in the embodiment of the present invention.

The input data to the neural network is supplied to the estimated confidence interval computation unit 20 in the information estimation apparatus 10 (step S11). The estimated confidence interval computation unit 20 is configured to perform the process in the order of the plurality of layers constituting the neural network. The input data is accordingly supplied to the input layer which is the first layer, to start the process in the neural network (step S12).

In the case where the layer supplied with the input data is an FC layer with dropout (integrated layer DF), the estimated confidence interval computation unit 20 performs a data analysis and computation process in cooperation with the data analysis unit 30 (step S14). The process in step S14 will be described later, with reference to FIGS. 8B and 8C. In the case where the layer supplied with the data is not an FC layer with dropout, on the other hand, the estimated confidence interval computation unit 20 performs the computation process set in the layer (step S15).

After the computation process in step S14 or S15 is completed, the output data resulting from the computation process is supplied to the next layer as the input data to the next layer (step S16). In the case where the next layer is the final output layer (step S17: "YES"), the variance of conditionally separated multivariate distributions is computed as one combined variance, and output from the output layer (step S18). In the case where the next layer is not the final output layer (step S17: "NO"), the process returns to step S13 to perform the computation process in the next layer.

The following describes the data analysis and computation process in step S14 in FIG. 8A, with reference to FIG. 8B. FIG. 8B is a flowchart showing an example of the data analysis and computation process in step S14 in FIG. 8A.

The data analysis and computation process in FIG. 8B is performed in the case where the input data is supplied to an FC layer with dropout. First, the estimated confidence interval computation unit 20 acquires input data $Xin^{DF}$ to integrated layer DF (step S141). It is assumed here that weight $W^{DF}$ and bias $b^{DF}$ are set in this integrated layer DF.

The estimated confidence interval computation unit 20 and the data analysis unit 30 then perform a type determination and computation process for each element from i=1 to i=$n_{Xout}^{DF}$ (i.e. all rows from the first to $n_{Xout}^{DF}$-th rows), for the i-th element $xout^{DF}_i$ of vector $Xout^{DF}$ of the output data computed using input data $Xin^{DF}$, weight $W^{DF}$, and bias $b^{DF}$ as described above. In detail, the estimated confidence interval computation unit 20 and the data analysis unit 30 first set i=1 (step S142), and perform the type determination and computation process for the i-th output data $Xout^{DF}_i$ from among the $n_{Xout}^{DF}$ number of elements (step S143). The type determination and computation process in step S143 will be described later, with reference to FIG. 8C.

After the type determination and computation process in step S143 is completed, in the case where the processing target $xout^{DF}_i$ is the last row (i.e. i=$n_{xout}^{DF}$) (step S144: "YES"), the data analysis and computation process ends. In the case where the processing target $xout^{DF}_i$ is not the last row (i.e. i≠$n_{Xout}^{DF}$) (step S144: "NO"), i is incremented (i.e. i=i+1) (step S145), and the process returns to step S143 to perform the type determination and computation process for $xout^{DF}_i$ of the next row.

The following describes the type determination and computation process in step S143 in FIG. 8B, with reference to FIG. 8C. FIG. 8C is a flowchart showing an example of the type determination and computation process in step S143 in FIG. 8B. FIG. 8C shows the computation process for a specific i-th element $xout^{DF}_i$.

In FIG. 8C, the data analysis unit 30 first computes the i-th output data $Xout^{DF}_i$ from among the $n_{Xout}^{DF}$ number of elements (step S1431). For the $n_{Xin}^{DF}$ number of $xin^{DF}W_{i,j}$ terms, for example, $\mu_{xin}^{DF}W_{i,j}$ is computed assuming that random variable $xin^{DF}_j$ is their mean $\mu_{xin}^{DF}_j$ (step S1432). Moreover, standard deviation $\sigma_{\mu w}$ of the $n_{Xin}^{DF}$ number of $xin^{DF}_jW_{i,j}$ terms is computed (step S1433). From among the $n_{xin}^{DF}$ number of $\mu_{xin}^{DF}_jW_{i,j}$ terms, all terms satisfying "absolute value $|\mu_{xin}^{DF}_jW_{i,j}| \geq \sigma_{\mu w}D_{ratio}$" are extracted, and arranged in descending order of absolute value $|\mu_{xin}^{DF}_jW_{i,j}|$ (step S1434).

In the case where no term satisfies $|\mu_{xin}^{DF}_jW_{i,j}| \geq \sigma_{\mu w}D_{ratio}$ (step S1435: "NO"), the data analysis unit 30 determines the i-th element $xout^{DF}_i$ as "type 2", and the estimated confidence interval computation unit 20 performs the computation process using the distribution computation method in "type 2" (step S1436). The computation process in "type 2" in step S1436 is as described above, and the multivariate sampling error sum is computed for all of the $n_{xin}^{DF}$ number of $xin^{DF}_jW_{i,j}$ terms.

In the case where any term satisfies $|\mu_{xin}^{DF}_jW_{i,j}| \geq \sigma_{\mu w}D_{ratio}$ (step S1435: "YES"), a predetermined number (n of terms are extracted in descending order of $|\mu_{xin}^{DF}_jW_{i,j}|$ and stored as a peak list (step S1437). The data analysis unit 30 then determines whether or not the remaining terms other than the peak terms stored as the peak list are small enough to be regarded as zero (step S1438).

In the case where the remaining terms are small enough to be regarded as zero (step S1438: "YES"), the data analysis unit 30 determines the i-th element $xout^{DF}_i$ as "type 1", and the estimated confidence interval computation unit 20 performs the computation process using the distribution computation method in "type 1" (step S1439). The computation process in "type 1" in step S1439 is as described above. For example, the computation is performed concerning all of the $2^{\wedge}n_{peak}$ cases at the maximum involving, for each of the maximum $n_{peak}$ number of $\mu_{Xin}^{DF}W_{i,j}$ terms stored as the peak list, the case where the term is selected as dropout and the case where the term is not selected as dropout.

In the case where the remaining terms are not small enough to be regarded as zero (step S1438: "NO"), the data analysis unit 30 determines the i-th element $xout^{DF}_i$ as "mixed type", and the estimated confidence interval computation unit 20 performs the computation process using the distribution computation method in "mixed type" (step S1440). The computation process in "mixed type" in step S1440 is as described above. For example, the computation is performed concerning all of the $2^{\wedge}n_{peak}$ cases at the maximum involving, for each of the maximum $n_{peak}$ number of $\mu_{Xin}^{DF}W_{i,j}$ terms stored as the peak list, the case where the term is selected as dropout and the case where the term is not selected as dropout. Further, the multivariate sampling error sum is computed for all remaining $xin^{DF}_jW_{i,j}$ terms.

Experimental Result

Figure 9:
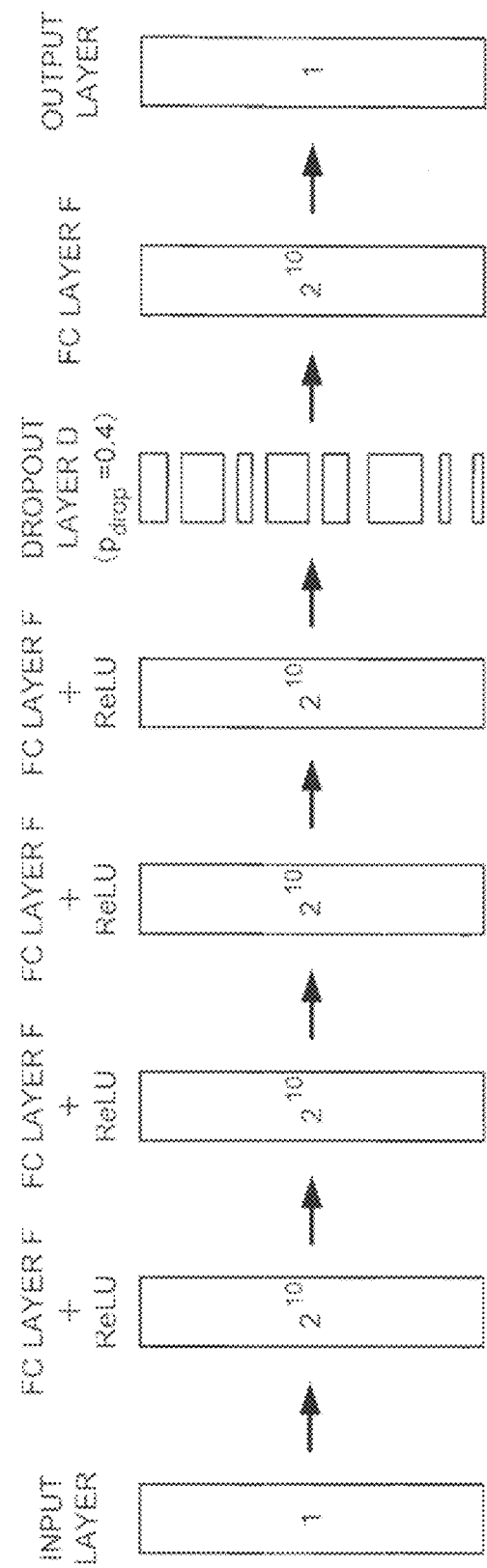
FIG. 9 is a diagram showing an example of the structure of a neural network used in an experiment relating to the embodiment of the present invention.

The following describes an experiment conducted using the technique proposed in the embodiment of the present invention described above. FIG. 9 shows the structure of a neural network used in the experiment. This neural network is intended for a regression problem of learning some simple function y=G(x) that receives scalar value x as input and outputs scalar value y from its output layer. The neural network is composed of a plurality of FC layers F (including computation process by ReLU function), dropout layer D (set to $p_{drop}$0.4), and FC layer F, where the number of neurons of the FC layer is 2^10=1024.

Figure 10A:
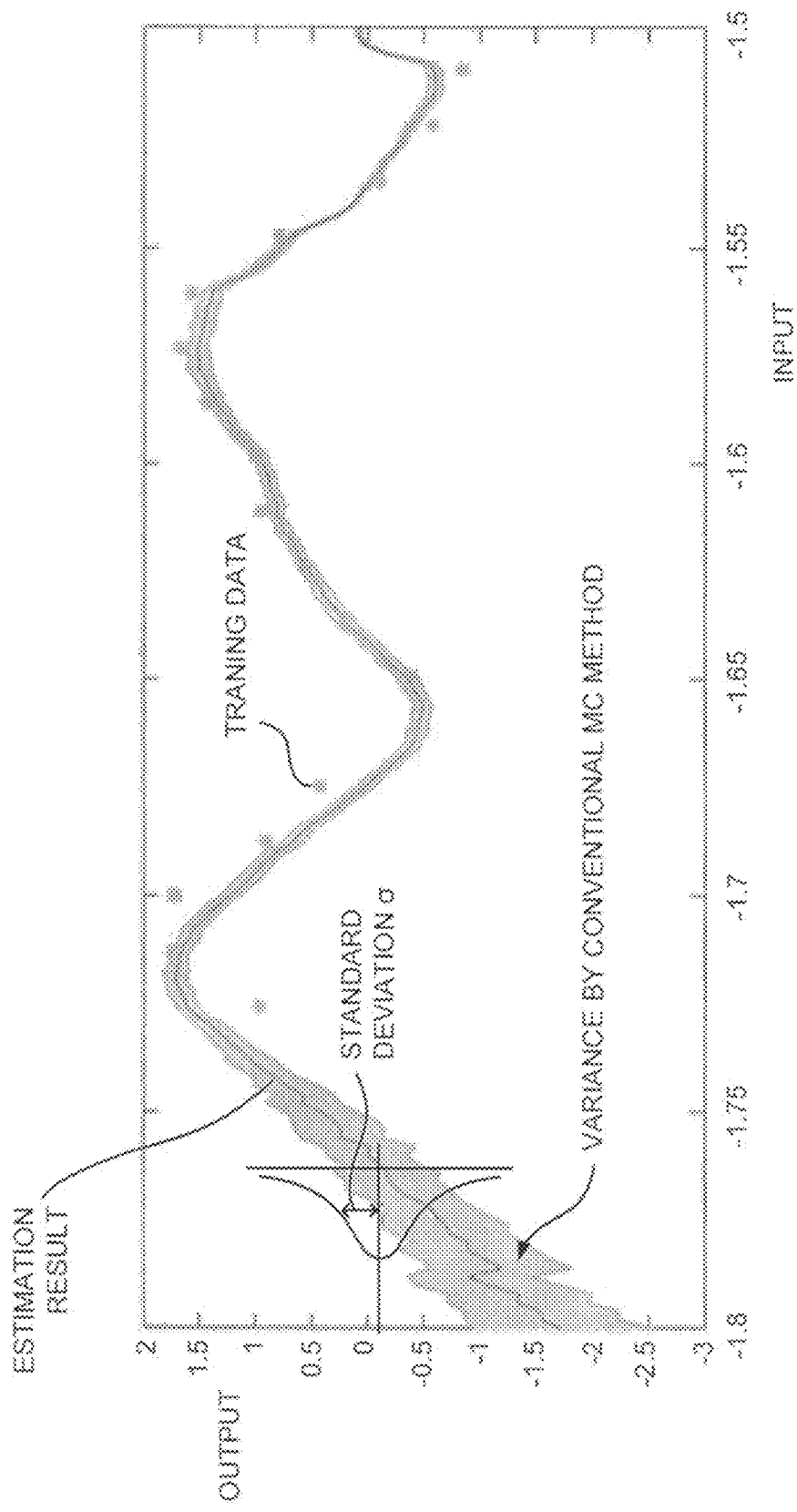
FIG. 10A is a graph showing an example of the function by the neural network and shows the result of the experiment and the result obtained by a conventional technique.
Figure 10B:
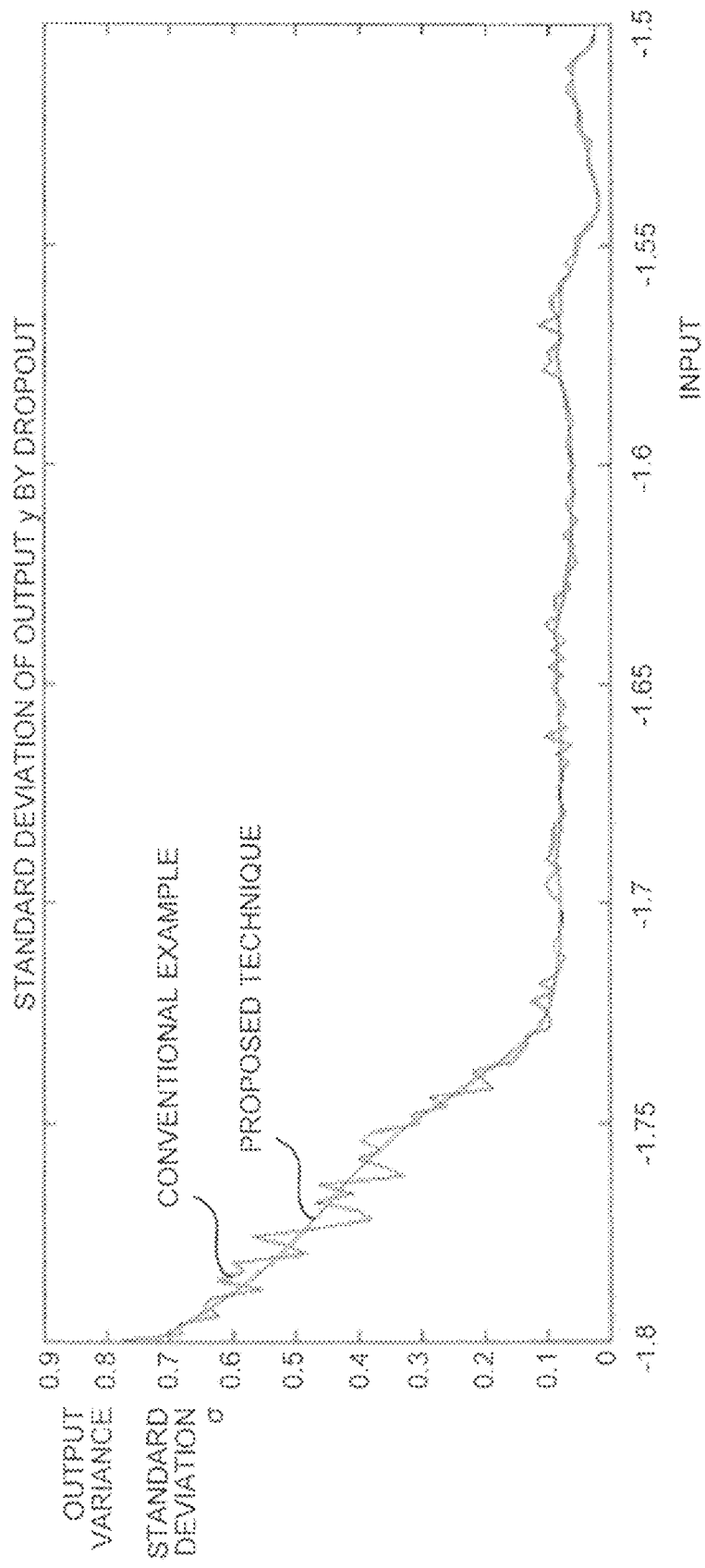
FIG. 10B is a graph showing an example of the value in the case of trying output value $xout^{DF}_i$ of an integrated layer many times and shows the result of the experiment and the result obtained by the conventional technique.

FIG. 10 shows the result of the experiment conducted using the technique proposed in the embodiment of the present invention. FIG. 10A shows this experimental result and the result obtained by a conventional technique, and is a graph showing an example of the function by the neural network. In FIG. 10A, for x in a given range, the estimation result of output value y of its function G(x) is shown, and also the square root (standard deviation a) of the variance of the estimate computed by the conventional technique disclosed in Non Patent Document 1 (the number of trials MC=40) is shown like a band. FIG. 10B shows this experimental result and the result obtained by the conventional technique, and is a graph showing an example of the value in the case of trying output value $xout^{DF}_i$ of the integrated layer many times. In FIG. 10B, for x in the same range, the square root of the variance in FIG. 10A and the square root of the variance computed by the technique proposed in the embodiment of the present invention are shown.

With the conventional technique, the fluctuation of the value of y obtained by performing estimation computation MC times for every input x is produced as the variance. Such variance is unstable. With the technique proposed in the embodiment of the present invention, on the other hand, the variance is computed analytically, so that a stable and smooth variance can be produced.

Supplementary Note 1: Computation of Variance of Sample Mean Error in the Case of Population being Random Variable Suppose population $y_i$ (123 i≤N) is a random variable obeying an N-dimensional multivariate Gaussian distribution, as shown below. Here, $\mu_y$ is an N-dimensional vector indicating a mean, and $\Sigma_y$ is an N×N variance-covariance matrix.

$$Y=(y_1, \ldots, y_i, \ldots, y_N) \sim \text{Gauss}(\mu_y, \Sigma_y) \quad (1 \leq i \leq N)$$

The variance of the sample mean error in the case of sampling n samples from this is computed, where:

- $a_i$ and $a_j$ (i≠j) are correlated (may be independent in the case where N is large);
- $y_i$ and $y_j$ (i≠j) are correlated; and
- $a_i$ and $y_j$ are independent.

The variance of the sample mean error is expressed as follows.

$$\text{Var}(\bar{y}) = \text{Var}\left(\frac{1}{n}\sum_{i=1}^{N} a_i y_i\right) = \frac{1}{n^2}\left[\sum_{i=1}^{N}\text{Var}(a_i y_i) + 2\sum_{i<j}^{N}\text{Cov}(a_i y_i, a_j y_j)\right]$$

Since $y_i$ is a random variable, $y_i$ cannot be taken out of variance Var and covariance Cov. Given that $a_i$ and $y_i$ are independent, the following expression holds.

$$\text{Var}(a_i y_i) = E(y_i)^2 \text{Var}(a_i) + E(a_i)^2 \text{Var}(y_i) + \text{Var}(a_i)\text{Var}(y_i)$$

$$\text{Cov}(a_i y_i, a_j y_j) =$$
$$E(a_i y_i a_j y_j) - E(a_i y_i)E(a_j y_j) = E(a_i a_j)E(y_i y_j) - E(a_i)E(y_i)E(a_j)E(y_j)$$

Hence, $y_i$ as a random variable is represented by expected value E. The following expression is used as in the above.

$$E(a_i) = \frac{n}{N}, \quad \text{Var}(a_i) = \frac{n}{N}\left(1 - \frac{n}{N}\right), \quad E(a_i a_j) = \frac{n}{N}\frac{(n-1)}{(N-1)}$$

The part of the first term of the variance of the sample mean error is expressed as follows.

$$\sum_{i=1}^{N}\text{Var}(a_i y_i) = \frac{n}{N}\left(1 - \frac{n}{N}\right)\sum_{i=1}^{N}E(y_i)^2 +$$
$$\left(\left(\frac{n}{N}\right)^2 + \frac{n}{N}\left(1 - \frac{n}{N}\right)\right)\sum_{i=1}^{N}\text{Var}(y_i)$$
$$= \frac{n}{N}\left(1 - \frac{n}{N}\right)\sum_{i=1}^{N}E(y_i)^2 + \left(\frac{n}{N}\right)\sum_{i=1}^{N}\text{Var}(y_i)$$
$$= \frac{n}{N}\left(1 - \frac{n}{N}\right)\sum_{i=1}^{N}E(y_i)^2 + \left(\frac{n}{N}\right)\sum_{i=1}^{N}\left(E(y_i^2) - E(y_i)^2\right)$$
$$= -\left(\frac{n}{N}\right)^2\sum_{i=1}^{N}E(y_i)^2 + \left(\frac{n}{N}\right)\sum_{i=1}^{N}E(y_i^2)$$

Moreover, the following relational expression holds.

$$2\sum_{i<j}^{N}E(y_i)E(y_j) = -\sum_{i=1}^{N}E(y_i)^2 + \left(\sum_{i=1}^{N}E(y_i)\right)^2$$

Using this relational expression, the part of the second term of the variance of the sample mean error is expressed as follows.

$$2\sum_{i<j}^{N}\text{Cov}(a_i y_i, a_j y_j) = 2\frac{n}{N}\frac{(n-1)}{(N-1)}\sum_{i<j}^{N}E(y_i y_j) - \left(\frac{n}{N}\right)^2 2\sum_{i<j}^{N}E(y_i)E(y_j) =$$
$$2\frac{n}{N}\frac{(n-1)}{(N-1)}\sum_{i<j}^{N}E(y_i y_j) - \left(\frac{n}{N}\right)^2\left[-\sum_{i=1}^{N}E(y_i)^2 + \left(\sum_{i=1}^{N}E(y_i)\right)^2\right] =$$
$$2\frac{n}{N}\frac{(n-1)}{(N-1)}\sum_{i<j}^{N}E(y_i y_j) - \left(\frac{n}{N}\right)^2\left[-\sum_{i=1}^{N}E(y_i)^2 + N^2(\bar{Y})^2\right]$$

The mean of $y_i$ as a random variable is $E(y_i)$. This is a value relating to index i. The mean for all indexes, i.e. the mean of the means, is the following.

$$\bar{Y} = \frac{1}{N}\sum_{i=1}^{N}E(y_i)$$

Combining these two parts yields the following variance of the sample mean error.

$$\text{Var}(\bar{y}) = \frac{1}{n^2}\left[-\left(\frac{n}{N}\right)^2 \sum_{i=1}^{N} E(y_i)^2 + \left(\frac{n}{N}\right) \sum_{i=1}^{N} E(y_i^2) + \right.$$

$$\left. 2\frac{n}{N}\frac{(n-1)}{(N-1)} \sum_{i<j}^{N} E(y_i y_j) - \left(\frac{n}{N}\right)^2 \left[-\sum_{i=1}^{N} E(y_i)^2 + N^2(\bar{Y})^2\right]\right] =$$

$$\frac{1}{n^2}\left[\left(\frac{n}{N}\right) \sum_{i=1}^{N} E(y_i^2) - n^2(\bar{Y})^2 + 2\frac{n}{N}\frac{(n-1)}{(N-1)} \sum_{i<j}^{N} E(y_i y_j)\right]$$

The variance of the sum of the sample population is defined by the following Expression (Formula) 1 using expected value E of $y_i$.

(Expression 1)

$\text{Var}(n * \bar{y}) =$ $$n^2 \text{Var}(\bar{y}) = \left(\frac{n}{N}\right) \sum_{i=1}^{N} E(y_i^2) - n^2 (\bar{Y})^2 + 2\frac{n}{N}\frac{(n-1)}{(N-1)} \sum_{i<j}^{N} E(y_i y_j)$$

There is no problem with Expression 1. However, Expression 1 uses expected value E of population data $y_i$ ($1 \le i \le N$), which is not convenient. It is desirable to represent this using variance $\text{Var}(y_i)$ and covariance $\text{Cov}(y_i, y_j)$ of each individual value $y_i$ of the population data as a random variable. Moreover, while population data $y_i$ is a random variable, it is desirable to also use variance $\text{Var}_{population}(y)$ as a whole that is expressed as follows if population data $y_i$ is a fixed value (employing mean $E(y_i)$).

$$\text{Var}_{population}(y) = \left(\frac{1}{N} \sum_{i=1}^{N} E(y_i)^2 - (\bar{Y})^2\right)$$

where $$\bar{Y} = \frac{1}{N} \sum_{i=1}^{N} E(y_i)$$

In view of these demands, the variance of the sum of the sample population is expressed using $\text{Var}_{population}(y)$ and variance $\text{Var}(y_i)$ and covariance $\text{Cov}(y_i, y_j)$ of the population data as a random variable. This leads to the following expression. A proof that this expression is equivalent to Expression 1 is given below.

Proposed $\text{Var}(n * \bar{y}) =$ $$\frac{n(N-n)}{(N-1)} * \text{Var}_{population}(y) + \frac{n}{N} \sum_{i=1}^{N} \text{Var}(y_i) + \frac{2n}{N}\frac{(n-1)}{(N-1)} \sum_{i<j}^{N} \text{Cov}(y_i, y_j)$$

First, the expression is modified using the following expressions.

$$\text{Var}(y_i) = E(y_i^2) - E(y_i)^2$$

$$\text{Cov}(y_i, y_j) = E(y_i y_j) - E(y_i) E(y_j)$$

Proposed $\text{Var}(n * \bar{y}) =$ $$\frac{n(N-n)}{(N-1)} * \text{Var}_{population}(y) + \frac{n}{N} \sum_{i=1}^{N} \text{Var}(y_i) + \frac{2n}{N}\frac{(n-1)}{(N-1)} \sum_{i<j}^{N} \text{Cov}(y_i, y_j) =$$

$$\frac{n(N-n)}{(N-1)} * \text{Var}_{population}(y) + \frac{n}{N} \sum_{i=1}^{N} E(y_i^2) - \frac{n}{N} \sum_{i=1}^{N} E(y_i)^2 +$$

$$\frac{2n}{N}\frac{(n-1)}{(N-1)} \sum_{i<j}^{N} E(y_i, y_j) - \frac{2n}{N}\frac{(n-1)}{(N-1)} \sum_{i<j}^{N} E(y_i) E(y_j)$$

The expression is then modified using the following expressions.

$$2 \sum_{i<j}^{N} E(y_i) E(y_j) = -\sum_{i=1}^{N} E(y_i)^2 + \left(\sum_{i=1}^{N} E(y_i)\right)^2$$

Proposed $\text{Var}(n * \bar{y}) =$ $$\frac{n(N-n)}{(N-1)} * \text{Var}_{population}(y) + \frac{n}{N} \sum_{i=1}^{N} E(y_i^2) - \frac{n}{N} \sum_{i=1}^{N} E(y_i)^2 +$$

$$\frac{2n}{N}\frac{(n-1)}{(N-1)} \sum_{i<j}^{N} E(y_i y_j) + \frac{n}{N}\frac{(n-1)}{(N-1)} \sum_{i=1}^{N} E(y_i)^2 - \frac{n}{N}\frac{(n-1)}{(N-1)} \left(\sum_{i=1}^{N} E(y_i)\right)^2$$

The expression is further modified using the following expressions.

$$\text{Var}_{population}(y) = \left(\frac{1}{N} \sum_{i=1}^{N} E(y_i)^2 - (\bar{Y})^2\right)$$

Proposed $\text{Var}(n * \bar{y}) =$ $$\frac{n(N-n)}{(N-1)} \left(\frac{1}{N} \sum_{i=1}^{N} E(y_i)^2 - (\bar{Y})^2\right) + \frac{n}{N} \sum_{i=1}^{N} E(y_i^2) - \frac{n}{N} \sum_{i=1}^{N} E(y_i)^2 +$$

$$\frac{2n}{N}\frac{(n-1)}{(N-1)} \sum_{i<j}^{N} E(y_i y_j) + \frac{n}{N}\frac{(n-1)}{(N-1)} \sum_{i=1}^{N} E(y_i)^2 - \frac{n}{N}\frac{(n-1)}{(N-1)} \left(\sum_{i=1}^{N} E(y_i)\right)^2 =$$

$$\left(\frac{n(N-n)}{N(N-1)} - \frac{n}{N} + \frac{n}{N}\frac{(n-1)}{(N-1)}\right) \sum_{i=1}^{N} E(y_i)^2 -$$

$$\left(\frac{n(N-n)}{(N-1)} + \frac{nN}{1}\frac{(n-1)}{(N-1)}\right)(\bar{Y})^2 + \frac{n}{N} \sum_{i=1}^{N} E(y_i^2) + \frac{2n}{N}\frac{(n-1)}{(N-1)} \sum_{i<j}^{N} E(y_i y_j)$$

The coefficients of the first and second terms in the expression given above are as follows.

Coefficient of $\sum_{i=1}^{N} E(y_i)^2$ $$\frac{n(N-n)}{N(N-1)} - \frac{n}{N} + \frac{n}{N}\frac{(n-1)}{(N-1)} =$$

$$\frac{nN - nn - nN + n + nn - n}{N(N-1)} = \frac{nN - nn - nN + n - n}{N(N-1)} = 0$$

Coefficient of $(\bar{Y})^2$ $$\frac{n(N-n)}{(N-1)} + \frac{nN}{1}\frac{(n-1)}{(N-1)} = \frac{nN - nn + nnN - nN}{(N-1)} = \frac{nn(N-1)}{(N-1)} = n^2$$

Using the above, the expression is modified as follows.

$$\text{Proposed Var}(n * \bar{y}) = -n^2(\bar{Y})^2 + \frac{n}{N}\sum_{i=1}^{N} E(y_i^2) + \frac{2n}{N}\frac{(n-1)}{(N-1)}\sum_{i<j}^{N} E(y_i y_j)$$

This expression is the variance of the sum of the sample population in Expression 1 computed above, and the following relationship is satisfied.

Proposed Var(n*$\bar{y}$)=Var(n*$\bar{y}$)

The conclusion is summarized below. Suppose there are N finite number of population data $y_i$ (1≤i≤N), and these data $y_i$ are not fixed values but random variables obeying N-dimensional multivariate Gaussian distribution as shown below. Here, $\mu_y$ is an N-dimensional vector indicating a mean, and $\Sigma_y$ is an N×N variance-covariance matrix.

Y~Gauss($\mu_y,\Sigma_y$) (1≤i≤N)

The variance of sample sum error in the case of sampling n random variables from the population of N random variables is as follows.

$$\text{Var}(n * \bar{y}) =$$

$$\frac{n(N-n)}{(N-1)} * \text{Var}_{population}(y) + \frac{n}{N}\sum_{i=1}^{N}\text{Var}(y_i) + \frac{2n}{N}\frac{(n-1)}{(N-1)}\sum_{i<j}^{N}\text{Cov}(y_i, y_j)$$

Here, variance Var($y_i$) and covariance Cov($y_i$, $y_j$) are the variance-covariance of the population of random variables obtained from the variance-covariance matrix. Variance $\text{Var}_{population}(y)$ is assumed to be the variance of the sample sum error in the case where each population is not a random variable (the value being assumed to be mean E($y_i$)), and expressed as follows.

$$\text{Var}_{population}(y) = \left(\frac{1}{N}\sum_{i=1}^{N} E(y_i)^2 - (\bar{Y})^2\right)$$

where $$\bar{Y} = \frac{1}{N}\sum_{i=1}^{N} E(y_i)$$

Supplementary Note 2: Computation of Covariance of Sample Mean Error

The covariance can be computed in the same way as the variance. Suppose two populations Y1 and Y2 are random variables obeying N-dimensional multivariate Gaussian distribution as shown below. Here, $\mu 1_y$ and $\mu 2_y$ are each an N-dimensional vector indicating a mean, and $\Sigma 1_y$ and $\Sigma 2_y$ are each an N×N variance-covariance matrix.

Y1=(y1$_1$, . . . , y1$_i$, . . . y1$_N$)~Gauss($\mu 1_y,\Sigma 1_y$)
(1≤i≤N)

Y2=(y2$_1$, . . . , y2$_i$, . . . y2$_N$)~Gauss($\mu 2_y,\Sigma 2_y$)
(1≤i≤N)

Covariance cov(Y1, Y2) of the sample mean error in the case of sampling n samples in the state where Y1 and Y2 are synchronized with respect to index i (i.e. when y1$_i$ is sampled, y2$_i$ is sampled, too) is computed.

The covariance can be represented by the variance using the following expression (formula).

$$\text{Cov}(Y1, Y2) = \frac{\text{Var}(Y1+Y2) - \text{Var}(Y1) - \text{Var}(Y2)}{2}$$

Var(Y1) and Var(Y2) are the variances of the sample mean errors mentioned above for populations Y1 and Y2 respectively, and so are computable.

Var(Y1 +Y2) is the variance of the sample mean error from new population Y1+Y2 expressed as follows as a result of adding the corresponding terms of populations Y1 and Y2 together.

Y1_2=(y1$_1$+y2$_1$, . . . y1$_i$+y2$_i$, . . . y1$_N$+y2$_N$)~Gauss
($\mu$_1_2$_y,\Sigma$_1_2$_y$) (1≤i≤N)

The mean error variance from this population can be computed by the above-mentioned method, by regarding the respective terms as one term y_1_2$_i$ where y_1_2$_i$=y1$_i$+y2$_i$.

The present invention enables stable and fast computation of a variance representing a confidence interval for an estimation result in an estimation apparatus using a neural network, and is applicable to all neural network-related technologies. The present invention also achieves a wider range of application of neural networks, and is highly effective in environments where fast and reliable processing is required, e.g. estimation for mobile objects such as cars or pedestrians.

What is claimed is:

1. In a hardware-based processing unit having implemented thereon a neural network and an information estimation apparatus, the information estimation apparatus using the neural network for performing an estimation process to obtain an estimation result,
wherein the neural network comprises a structure that includes an integrated layer that combines a dropout layer for dropping out a part of input data and a fully connected layer for computing a weight, and
wherein the information estimation apparatus comprises:
a data analysis unit configured to calculate from being acquired input data each vector element of output data of a numerical distribution of terms output from the integrated layer having a multivariate distribution based on
determining a user defined number of peak terms each of which is a product of the acquired input data and a represented weight in the integrated layer by
estimating how much each determined peak term is exceptionally larger than other terms of the numerical distribution of terms, and collecting the peak terms, and
approximating the output from the integrated layer as a sum of dropout and not dropout conditions for all peak terms,
where each peak term is composed of
the product of the probability of dropout condition for all peak terms and
conditional Gaussian distribution under dropout condition which is calculated by dropout sampling sum of the portion of the Gaussian distribution, the portion of the Gaussian distribution excluding the peak terms; and
an estimated confidence interval computation unit configured to apply an optimum approximation computation method associated with the output data calculated by the data analysis unit to analytically compute a variance of each vector element of the output data from the integrated layer based on the input data to the integrated layer;

whereby the computed variances provide a reliable confidence level for the estimation result adapted to be used by at least a mobile object.

2. An information estimation method for performing an estimation process using a hardware-based processing unit having implemented thereon a neural network comprising a structure that includes an integrated layer that combines a dropout layer for dropping out a part of input data and a fully connected layer for computing a weight, the information estimation method comprising:

a data analysis step to calculate from being acquired input data each vector element of output data of a numerical distribution of terms output from the integrated layer having a multivariate distribution based on
determining a user defined number of peak terms each of which is a product of the acquired input data and a represented weight in the integrated layer by
estimating how much each determined peak term is exceptionally larger than other terms of the numerical distribution of terms, and collecting the peak terms, and
approximating the output from the integrated layer as a sum of dropout and not dropout conditions for all peak terms,
where each peak term is composed of
the product of the probability of dropout condition for all peak terms and
conditional Gaussian distribution under dropout condition which is calculated by dropout sampling sum of the portion of the Gaussian distribution, the portion of the Gaussian distribution excluding the peak terms; and an estimated confidence interval computation step of applying an optimum approximation computation method associated with the output data calculated by the data analysis step to analytically compute a variance of each vector element of the output data from the integrated layer based on the input data to the integrated layer;

whereby the computed variances provide a reliable confidence level for the estimation result adapted to be used by at least a mobile object.

3. A non-transitory computer-readable medium comprising instructions that cause an information estimation unit of a hardware-based processing unit, in response to the instructions, to output an estimation result adapted to be used by at least a mobile object, the instructions causing the information estimation unit to:

perform an estimation process using a neural network implemented on the hardware-based processing unit that includes an integrated layer that combines a dropout layer for dropping out a part of input data and a fully connected layer for computing a weight;

wherein the estimation process comprises:

a data analysis step to calculate from being acquired input data each vector element of output data of a numerical distribution of terms output from the integrated layer having a multivariate distribution based on
determining a user defined number of peak terms each of which is a product of the acquired input data and a represented weight in the integrated layer by
estimating how much each determined peak term is exceptionally larger than other terms of the numerical distribution of terms, and collecting the peak terms, and
approximating the output from the integrated layer as a sum of dropout and not dropout conditions for all peak terms,
where each peak term is composed of
the product of the probability of dropout condition for all peak terms and
conditional Gaussian distribution under dropout condition which is calculated by dropout sampling sum of the portion of the Gaussian distribution, the portion of the Gaussian distribution excluding the peak terms; and an estimated confidence interval computation step of applying an optimum approximation computation method associated with the output data calculated by the data analysis step to analytically compute a variance of each vector element of the output data from the integrated layer based on the input data to the integrated layer;

whereby the computed variances provide a reliable confidence level for the estimation result to be used by the mobile object.

* * * * *